US011971323B2

(12) United States Patent
Hui et al.

(10) Patent No.: US 11,971,323 B2
(45) Date of Patent: Apr. 30, 2024

(54) ESTIMATING NONLINEAR PHASE SHIFT IN A MULTI-SPAN FIBER-OPTIC LINK USING A COHERENT RECEIVER

(71) Applicant: CIENA CORPORATION, Hanover, MD (US)

(72) Inventors: Rongqing Hui, Lenexa, KS (US); Maurice Stephen O'Sullivan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/450,052

(22) Filed: Aug. 15, 2023

(65) Prior Publication Data
US 2023/0400382 A1 Dec. 14, 2023

Related U.S. Application Data

(62) Division of application No. 17/382,630, filed on Jul. 22, 2021, now Pat. No. 11,821,807.

(60) Provisional application No. 63/141,048, filed on Jan. 25, 2021.

(51) Int. Cl.
*G01M 11/00* (2006.01)
(52) U.S. Cl.
CPC .... *G01M 11/3118* (2013.01); *G01M 11/3145* (2013.01); *G01M 11/3181* (2013.01)
(58) Field of Classification Search
CPC .......... G01M 11/3118; G01M 11/3145; G01M 11/3181; G01M 11/332
See application file for complete search history.

(56) References Cited

U.S. PATENT DOCUMENTS

| 3,697,757 A | 10/1972 | Stone |
| 6,947,129 B1 | 9/2005 | Lu et al. |
| 7,376,358 B2 | 5/2008 | Roberts et al. |
| (Continued) | | |

FOREIGN PATENT DOCUMENTS

| EP | 1248393 A2 | 10/2002 |
| WO | 2009039274 A2 | 3/2009 |

OTHER PUBLICATIONS

Agrawal G., "Nonlinear Fiber Optics, 4th ed.", 2007, 10 pages.
(Continued)

*Primary Examiner* — Seung C Sohn
(74) *Attorney, Agent, or Firm* — Baratta Law PLLC; Lawrence A. Baratta, Jr.

(57) ABSTRACT

A transmitter generates a first electrical signal comprising a first low-frequency signal, an empty period, and a pump pulse having a first frequency; and a second electrical signal comprising a second low-frequency signal and at least two probe pulses, each probe pulse having a second frequency that differs from the first frequency. The transmitter modulates first and second optical subcarriers having different polarizations using the first and second electrical signals, respectively. The transmitter generates an optical signal from the first and second optical subcarriers, wherein the first and second low-frequency signals overlap in time, wherein the empty period overlaps in time with one of the probe pulses, and wherein the pump pulse overlaps in time with another one of the probe pulses. The optical signal is detected at a receiver over an optical link, and the receiver uses the optical signal to estimate nonlinear phase shift in the optical link.

10 Claims, 18 Drawing Sheets

(56) References Cited

U.S. PATENT DOCUMENTS

| | | | |
|---|---|---|---|
| 7,756,421 | B2 | 7/2010 | Roberts et al. |
| 8,594,499 | B1 | 11/2013 | Roberts et al. |
| 9,520,950 | B2 * | 12/2016 | Harley .............. H04B 10/532 |
| 9,768,875 | B2 | 9/2017 | Zhuge et al. |
| 9,768,880 | B2 | 9/2017 | Zhuge et al. |
| 9,960,843 | B2 | 5/2018 | Shiner et al. |
| 10,090,920 | B1 | 10/2018 | Zhuge et al. |
| 10,211,920 | B1 * | 2/2019 | Khaleghi ......... H04B 10/25253 |
| 2004/0184398 | A1 | 9/2004 | Walton et al. |
| 2004/0208271 | A1 | 10/2004 | Gruenberg et al. |
| 2005/0058417 | A1 | 3/2005 | Tadakuma et al. |
| 2006/0192969 | A1 | 8/2006 | Marks et al. |
| 2007/0025638 | A1 | 2/2007 | Ozcan et al. |
| 2007/0027689 | A1 | 2/2007 | Ozcan et al. |
| 2009/0073432 | A1 | 3/2009 | Jalali et al. |
| 2009/0324249 | A1 | 12/2009 | Zhang |
| 2010/0183060 | A1 | 7/2010 | Lee et al. |
| 2011/0001959 | A1 | 1/2011 | Hasegawa |
| 2011/0085797 | A1 | 4/2011 | Xu et al. |
| 2011/0292377 | A1 | 12/2011 | Osenberg et al. |
| 2015/0071174 | A1 | 3/2015 | Hui |
| 2015/0171972 | A1 | 6/2015 | Xie et al. |
| 2015/0380892 | A1 | 12/2015 | Fermann et al. |
| 2016/0233963 | A1 | 8/2016 | Zhuge et al. |
| 2016/0323091 | A1 | 11/2016 | Inoue |
| 2017/0041078 | A1 | 2/2017 | Le et al. |

OTHER PUBLICATIONS

Cao Y., et al., "A Fast and Accurate Method to Estimate XPM Impact Under PMD", Proceedings of COIN2012, May 2012, 2 pages.

Choi H G., et al., "Nonlinearity-Tolerant OSNR Estimation Technique for Coherent Optical Systems", 2015 Optical Fiber Communications Conference (OFC), 2015, pp. 1-3.

Damask J N., "Polarization Optics in Telecommunications", Springer, 2005, 12 pages.

Dong Z., et al., "OSNR Monitoring for QPSK and 16-QAM Systems in Presence of Fiber Nonlinearities for Digital Coherent Receivers", Optics Express, 2012, vol. 20, pp. 19520-19534.

Extended European Search report for Application No. 17167511.9, mailed Sep. 12, 2017, 10 pages.

Galtarossa., et al., "Spatially Resolved PMD Measurements", Journal of Lightwave Technology, Apr. 2004, vol. 22, issue. 4, pp. 1103-1115.

Gjesteland., "Technical Solution and Implementation of the Svalbard Fibre Cable", Telektronikk, 2004, pp. 140-152.

Gruss., Extended European Search Report for EP17167511, Sep. 12, 2017, 29 pages.

Hui., et al., "Characterization of Electrostriction Nonlinearity in a Standard Single-Mode Fiber Based on Coherent Detection and Cross-Phase Modulation", Journal of Lightwave Technology, Nov. 15, 2015, vol. 33, issue. 22, pp. 4547-4553.

Hui., et al., "Fiber Optic Measurement Techniques", Elsevier Academic Press, 2009, pp. 5.

Marcuse et al., "Application of the Manakov-PMD equation to studies of signal propagation in optical fibers with randomly varying birefringence", Journal of Lightwave Technology, vol. 15, p. 1735, 1997.

Myslivets E., et al., "Spatially Resolved Measurements of the Chromatic Dispersion in Fibers", Journal of Lightwave Technology, vol. 33, No. 3, Feb. 1, 2015, pp. 597-608.

Nelson., et al., "Statistics of polarization dependent loss in an installed long-haul WDM system", Optical Society of America, Mar. 2011, vol. 19, No. 7, pp. 6790-6796.

Ohashi M., "Fiber Measurement Technique Based on OTDR", InTech, 2013, pp. 511-539.

Onaka et al., "Measuring the Longitudinal Distribution of Four-Wave Mixing Efficiency in Dispersion-Shifted Fibers", EEE Photonics Technology Letters, vol. 6, No. 12, p. 1454, Dec. 1994.

Onaka H., et al., "Measuring the Logitudinal Distribution of Four-Wave Mixing Efficiency in Dispersion-Shifted Fibers", IEEE Photonics Technology Letters, vol. 6, No. 12, Dec. 1994, pp. 1454-1456.

Poggiolini P., "The GN Model of Non-Linear Propagation in Uncompensated Coherent Optical Systems", Journal of Lightwave Technology, Dec. 15, 2012, vol. 30, No. 24, pp. 3857-3879.

Prigent et al., "Measurement of fiber nonlinear Kerr coefficient by four-wave mixing", IEEE Photonics Technology Letters, vol. 5, p. 1092, 1993.

Reimer M., et al., "Direct Measurement of Nonlinear WDM Crosstalk Using Coherent Optical Detection", IEEE Photonics Conference, 2012, Sep. 23, 2012, pp. 322-323.

Restriction Requirement for U.S. Appl. No. 17/382,630 mailed Jun. 23, 2023.

Rongqing H., et al., "Characterization of 1-15 Electrostriction Nonlinearity in a Standard Single-Mode Fiber Based on Coherent Detection and Cross-Phase Modulation", Journal of Lightwave Technology, Nov. 15, 2015, vol. 33. No. 22, pp. 4547-4553.

Shiner A D., et al., "Demonstration of an 8-Dimensional Modulation Format with Reduced Inter-channel Nonlinearities in a Polarization Multiplexed Coherent System," Optics Express, vol. 22, No. 17, Aug. 25, 2014, pp. 20366-20374.

Toge K., et al., "Recent Research and Development of Optical Fiber Monitoring in Communication Systems", Photonic Sensors, 2013, vol. 3, issue. 4, pp. 304-313.

Vorbeck et al., "Cumulative Nonlinear Phase Shift as Engineering Rule for Performance Estimation in 160-GB/s Transmission Systems", IEEE Photonics Technology Letters, vol. 16, p. 2571, 2004.

Wahlstrand J K., et al., "Effect of Two-Beam Coupling in Strong-Field Optical Pump-Probe Experiments", Physical Review 87, 053801, May 2013, pp. 053801-1 to 053801-13.

* cited by examiner

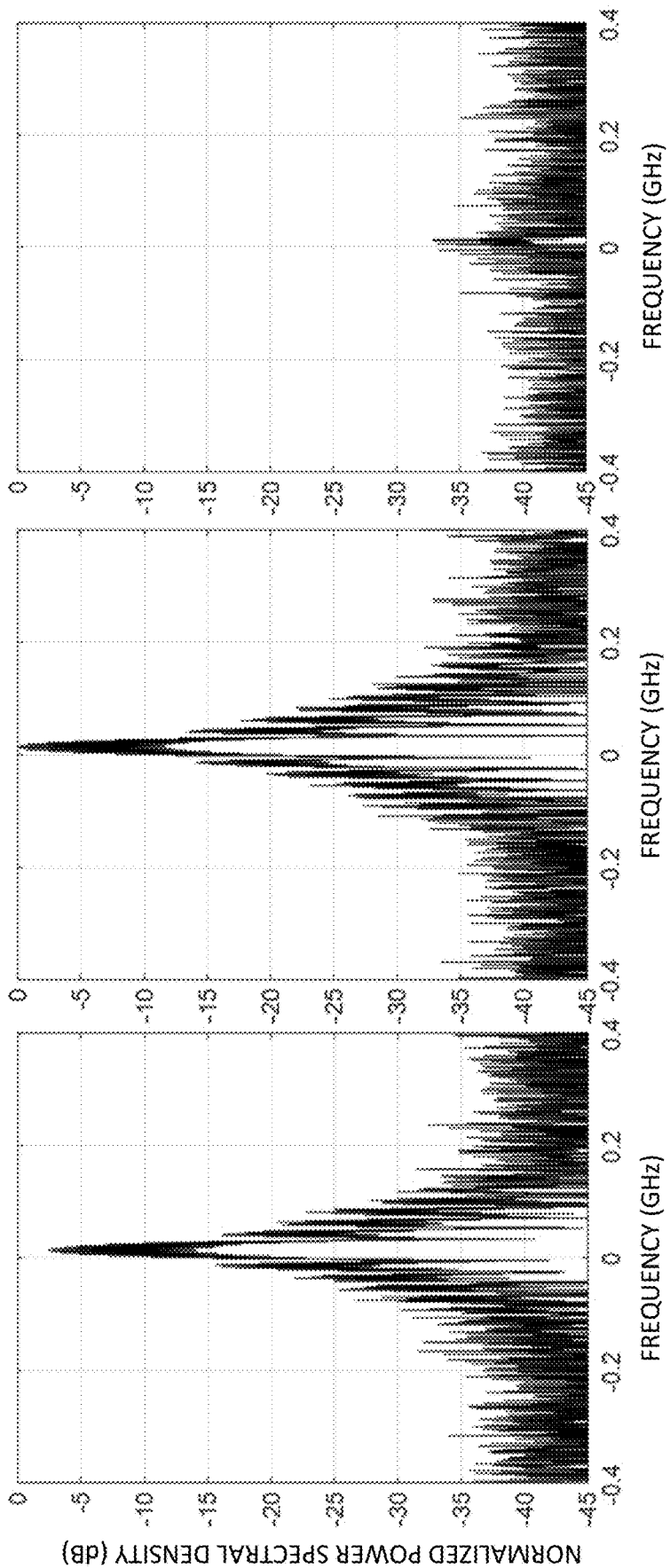

ESTIMATING NONLINEAR PHASE SHIFT IN A MULTI-SPAN FIBER-OPTIC LINK USING A COHERENT RECEIVER

TECHNICAL FIELD

This document relates to the technical field of coherent optical communications and more specifically to the characterization of optical properties of deployed telecommunication cables.

BACKGROUND

Accurate link budgeting for optically amplified multi-span fiber-optic systems requires detailed knowledge of the dispersion map, fiber nonlinearity, and per-wavelength power output by each amplifier (power profile), which may vary from span to span along the link (gain evolution). In practice, complete dispersion, nonlinearity parameter, and manufacturing data for deployed cables is often not available to third-party terminal equipment suppliers or cable owners, and it is only possible to measure the power profile at the termination points of the link. Optical Time Domain Reflectometers (OTDRs) are usually used to measure loss along a link on a per-span basis.

The cumulative dispersion at the end of an optical link is reported by the WL3 coherent modems commercially available from Ciena Corporation headquartered in Hanover, Maryland, USA.

Kerr effect nonlinearity in optical fibers is known to cause transmission performance degradation in fiber optic communication systems. With the increase of wavelength-division multiplexed (WDM) channels and per-channel data rates, performance penalties induced by fiber nonlinearity become more and more important in optical network design and operation. With the wide adoption of coherent optical systems and digital signal processing (DSP) in which signals are carried by complex optical fields, the impacts of chromatic dispersion (CD) and polarization mode dispersion (PMD) can be compensated by digital filtering. However, it still remains challenging to compensate transmission performance degradation caused by fiber nonlinearities manifested through self-phase modulation (SPM), cross-phase modulation (XPM), and four-wave mixing (FWM). Nonlinear phase created on an optical carrier (that is, the phase imparted to the optical field envelope by means of the Kerr effect stemming from the intensity of the optical field) is an important measure of fiber nonlinearity, which depends on signal optical power and the fiber nonlinear parameter. In a fiber system with multiple spans and inline optical amplifiers, nonlinear phase from different fiber spans will accumulate. As described by Poggiolini in "The GN Model of Non-Linear Propagation in Uncompensated Coherent Optical Systems", *Journal of Lightwave Technology*, vol. 30, no. 24, p. 3857, 2012, knowledge of nonlinear phase in each amplified fiber span is desirable in optical network design and performance evaluation. The accumulated nonlinear phase between the transmitter and the receiver can also be useful to estimate the transmission performance, as described by Vorbeck et al. in "Cumulative Nonlinear Phase Shift as Engineering Rule for Performance Estimation in 160-Gb/s Transmission Systems", *IEEE Photonics Technology Letters*, vol. 16, p. 2571, 2004.

Various techniques have been demonstrated to measure fiber nonlinearities based on the measurements of SPM, XPM or FWM, as described, for example, by Prigent et al. in "Measurement of fiber nonlinear Kerr coefficient by four-wave mixing", *IEEE Photonics Technology Letters*, vol. 5, p. 1092, 1993, and by Hui et al. in "Fiber Optic Measurement Techniques", Academic Press, 2009.

In "Measuring the Longitudinal Distribution of Four-Wave Mixing Efficiency in Dispersion-Shifted Fibers", *IEEE Photonics Technology Letters*, vol. 6, no. 12, p. 1454, December 1994, Onaka et al. describe pump/probe techniques for measuring the zero dispersion wavelength as well as the nonlinear refractive index $n_2$ of an optical fiber (given the effective area of the fiber) by measuring the variation in FWM efficiency as a function of wavelength separation between continuous-wave pump and probe wavelengths. FWM efficiency is maximized at the zero dispersion wavelength and the wavelength dependent periodicity of the FWM efficiency is related to the chromatic dispersion.

Pump/probe techniques for measuring the zero dispersion wavelength have been published where the spatial overlap of forward propagating probe pulses with backward propagating pump pulses at a different wavelength is observed through the production of FWM products at inter modulation frequencies. This technique would be difficult to employ on optically amplified multi-span fiber systems, such as submarine cables, where counter propagating waves are blocked by optical amplifiers.

In "Current Developments in Optical Fiber Technology", Dr. Sulaiman Wadi Harun (Ed.), ISBN: 978-953-51-1148-1, 2013, the chapter authored by Ohashi entitled "Fiber Measurement Technique Based on OTDR" reports using the Rayleigh scattering efficiency to extract the mode field diameter and dispersion. These techniques generally rely on averaging measurement in both directions and require precise measurement of the back scattered power which will be difficult to measure when the scattered light has to return to the transmission site through hundreds of amplifiers.

A simulation technique based on calculating the nonlinear interaction between pump and probe pulses propagating at different wavelengths is described by Cao et al. in "A fast and accurate method to estimate XPM impact under PMD", in 10*th International Conference on Optical Internet (COIN)*, Yokohama, Japan, 2012. The authors propose calculating the nonlinear rotation matrix between the pump and probe pulses at the end of each span. This matrix accounts for the action of XPM and cross-polarization modulation (XPolM) in the span. The intent of the work by Cao et al. is to develop a simulation tool. The authors compare their model's predictions to those of split step Fourier simulations. There is no discussion of methods for performing experimental measurements.

U.S. Pat. No. 9,960,843 to Shiner et al., incorporated herein by reference in its entirety, describes the use of pump-probe measurements on multi-span optical links for the determination of one or more of 1) wavelength-dependent power profile and gain evolution along the optical link; 2) wavelength-dependent dispersion map; and 3) location of regions of high polarization dependent loss (PDL) and PMD. Separate time-synchronized modems may be used to generate the pump signal and probe signal, respectively.

U.S. Pat. No. 10,090,920 to Zhuge et al. describes a method of fiber Kerr nonlinear noise estimation in an optical transmission system comprising recovering received symbols from a received signal, isolating a noise component of the received signal, estimating coefficients of a matrix based on cross-correlations between the isolated noise component and the fields of a triplet of received symbols or training symbols or estimated transmitted symbols, estimating doublet correlations of the product or the quotient of the isolated noise component and the field of a received symbol or of a training symbol or of an estimated transmitted symbol, and estimating one or more parameters related to nonlinear noise based on the estimated coefficients of the matrix and based on the estimated doublet correlations.

SUMMARY

According to a first broad aspect, a transmitter is configured to generate a first electrical signal comprising a first pulse sequence including a first low-frequency signal, an empty period, and a pump pulse having a first frequency, and to generate a second electrical signal comprising a second pulse sequence including a second low-frequency signal and at least two probe pulses, each probe pulse having a second frequency that differs from the first frequency. The transmitter is further configured to modulate a first optical subcarrier using the first electrical signal, and to modulate a second optical subcarrier using the second electrical signal, the second optical subcarrier having a different polarization than the first optical subcarrier. The transmitter is further configured to generate, from the first and second optical subcarriers, an optical signal for transmission over an optical link, where the first and second low-frequency signals overlap in time, where the empty period overlaps in time with one of the probe pulses, and where the pump pulse overlaps in time with another one of the probe pulses.

According to some examples, at least one of the probe pulses has a different amplitude than an amplitude of at least one other of the probe pulses.

According to some examples, the first and second optical subcarriers are orthogonally polarized.

According to some examples, the first and second low-frequency signals comprise band-limited noise having a mean of zero and a central frequency between the first and second frequencies.

According to some examples, each of the probe pulses comprises substantially stable power for a duration greater than twice a pump-probe walk-off anticipated following transmission of the optical signal over all spans of the optical link, where the pump-probe walk-off comprises a temporal delay, induced by chromatic dispersion (CD), between the pump pulse and the probe pulse with which the pump pulse overlaps.

According to some examples, the pump pulse has a duration lower than a pump-probe walk-off anticipated following transmission of the optical signal over a single span of the optical link, the pump-probe walk-off comprising a temporal delay, induced by CD, between the pump pulse and the probe pulse with which the pump pulse overlaps.

According to some examples, the pump pulse comprises substantially stable power for a duration greater than the CD-induced pump-probe walk-off anticipated following transmission of the optical signal over all spans of the optical link.

According to some examples, the pump pulse comprises a first pump pulse, the first pulse sequence further includes a second pump pulse having a different duration than the first pump pulse, and the second pump pulse overlaps in time with a further one of the probe pulses.

According to some examples, the first electrical signal comprises multiple repetitions of the first pulse sequence, and the second electrical signal comprises a repetition of the second pulse sequence for each repetition of the first pulse sequence.

According to some examples, the first pulse sequence comprises multiple instances of the first low-frequency signal and multiple instances of the pump pulse, and the second pulse sequence comprises an instance of the second low-frequency signal for each instance of the first low-frequency signal, and an instance of the probe pulse for each instance of the pump pulse.

According to a second broad aspect, a receiver is configured to detect an optical signal received over an optical link, the optical signal conveying at least two probe pulses at a first frequency. The receiver is further configured to generate, from electrical signals representing in-phase (I) components of the optical signal in two different polarizations, a set of I samples, and to generate, from electrical signals representing quadrature (Q) components of the optical signal in the two different polarizations, a set of Q samples. The receiver is further configured to isolate a set of probe samples by, selecting from the set of I samples and the set of Q samples, samples having the first frequency. The receiver is further configured to identify, within the set of probe samples, first and second samples respectively associated with first and second interactions experienced over the optical link, where the first interaction is between a first one of the probe pulses and a first pump pulse having (i) a second frequency differing from the first frequency and (ii) a pump polarization differing from a polarization of the probe pulses, and where the second interaction is between a second one of the probe pulses and an empty period in the pump polarization. The receiver is further configured to generate a first estimate of nonlinear phase shift in the optical link using the first and second samples.

According to some examples, the first and second samples comprise a plurality of first samples and a plurality of second samples, and the receiver is configured to multiply the plurality of first samples by the complex conjugate of the plurality of second samples to generate a respective plurality of products; to determine from the plurality of products a respective plurality of phase difference estimates, each phase difference estimate comprising an estimate of a difference between an optical phase of one of the first samples and an optical phase of one of the second samples; and to calculate an average of the plurality of phase difference estimates.

According to some examples, the receiver is further configured to identify the first and second samples using their respective amplitudes.

According to some examples, the pump polarization is orthogonal to the polarization of the probe pulses.

According to some examples, the receiver is further configured to use the first estimate of nonlinear phase shift to estimate one or more of a number of spans comprised in the optical link, a power level of each span in the link, an optical fiber type of each span in the link, CD of each span in the link, net CD of the link, and self-phase modulation in the link.

According to some examples, the receiver is further configured to identify within the set of probe samples a third sample associated with a third interaction experienced over the optical link, where the third interaction is between a third one of the probe pulses and a second pump pulse having the second frequency and the pump polarization, and where the second pump pulse has a different duration than the first pump pulse; and to generate a second estimate of nonlinear phase shift in the optical link using the second and third samples.

According to some examples, each of the probe pulses comprises substantially stable power for a duration greater than twice a pump-probe walk-off incurred following transmission of the optical signal over all spans of the optical link, the pump-probe walk-off comprising a temporal delay, induced by CD, between the first one of the probe pulses and the first pump pulse.

According to some examples, the receiver is further configured to apply a digital bandpass filter to the set of I samples and the set of Q samples, the digital bandpass filter attenuating any samples having frequencies outside of a bandwidth comprising the first frequency.

According to some examples, the digital bandpass filter has a full width at half maximum (FWHM) bandwidth of 6 GHz or lower.

According to some examples, the receiver is further configured to apply a Jones matrix operation to the electrical signals representing the I and Q components of the two polarizations of the optical signal, thereby maximizing those of the electrical signals representing the polarization of the probe pulses, and minimizing those of the electrical signals representing the pump polarization

BRIEF DESCRIPTION OF THE DRAWINGS

FIGS. 21 and 22 illustrate plots of normalized power spectral density in dB as a function of frequency in GHz of the complex field of a frequency-down-converted probe pulse in the X and Y polarizations, respectively, normalized by the maximum power spectral density in the Y polarization, prior to polarization selection, in accordance with some examples of the proposed technology;

FIG. 23 illustrates a plot of normalized power spectral density in dB as a function of frequency in GHz of the complex field of a frequency-down-converted probe pulse in the Y polarization, normalized by the maximum power spectral density in the X-polarization, after polarization selection, in accordance with some examples of the proposed technology;

DETAILED DESCRIPTION

Figure 1:
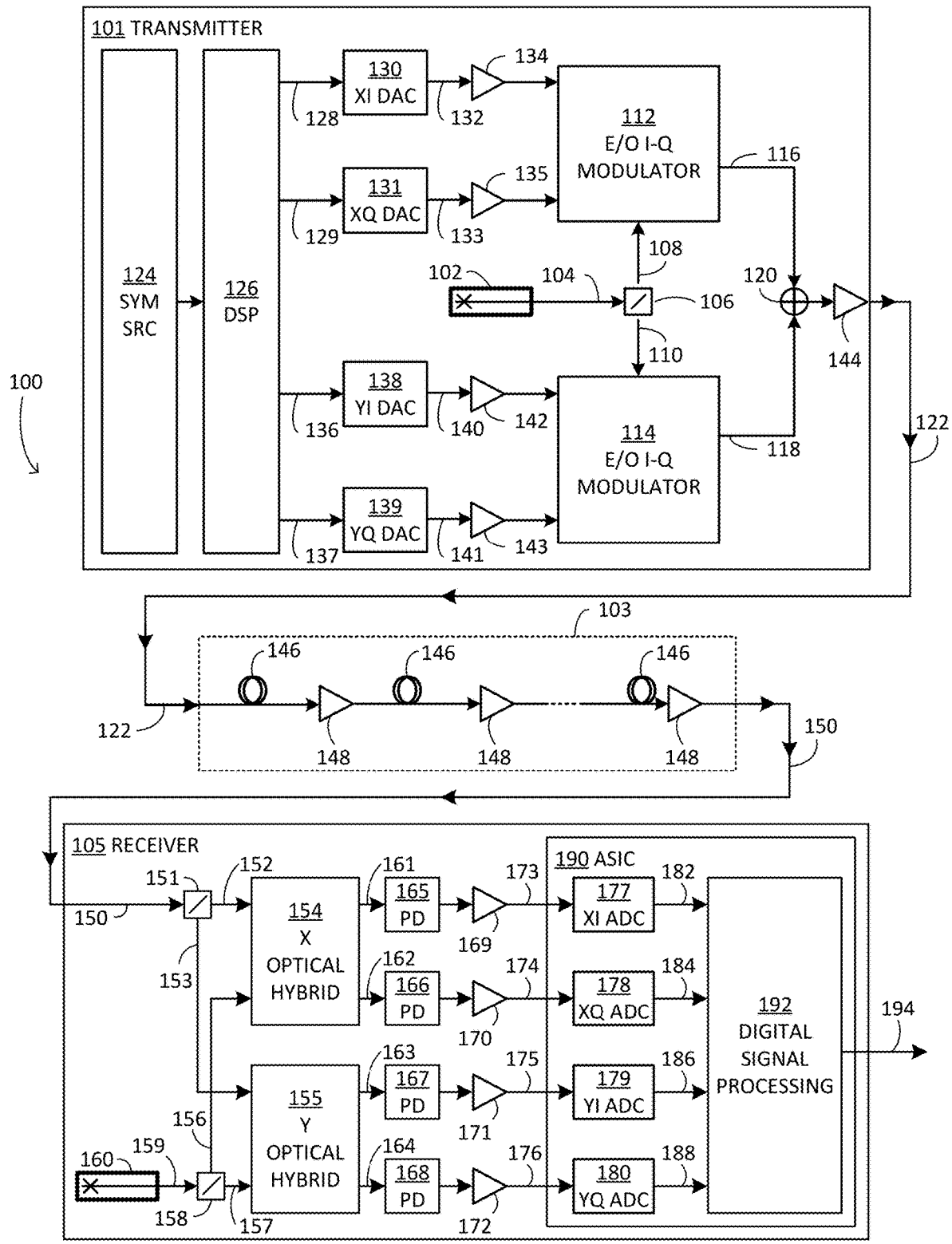
FIG. 1 illustrates an optical communication system in accordance with some examples of the proposed technology.

FIG. 1 illustrates an example optical communication system 100. A transmitter 101 and a receiver 105 are connected via a telecommunications cable (not shown) carrying optical fibers. The cable may be, for example, a submarine cable or a terrestrial cable. One or both of the transmitter 101 and the receiver 105 may comprise a transceiver capable of both transmitting optical signals and receiving optical signals.

The transmitter 101 employs polarization-division multiplexing (PDM). A laser 102 is operative to generate a continuous wave (CW) optical carrier 104. A polarizing beam splitter 106 is operative to split the CW optical carrier 104 into orthogonally-polarized components 108, 110 (nominally referred to as the "X-polarization" component and the "Y-polarization" component) that are modulated by respective electrical-to-optical modulators 112, 114 to produce modulated polarized optical signals 116, 118, respectively. The signals 116, 118 are combined by a beam combiner 120, and the resulting combined signal is amplified by an optical amplifier 144 to yield an optical signal 122. According to some examples, the optical amplifier 144 may comprise an erbium-doped fiber amplifier (EDFA).

A symbol source 124 is operative to generate a stream of symbols representing data to be transmitted in the optical signal 122. A digital signal processor (DSP) 126 is operative to process the symbols output from the symbol source 124, for example, performing one or more of pulse shaping, subcarrier multiplexing, chromatic dispersion (CD) pre-compensation, and distortion pre-compensation on the symbols. The DSP 126 is operative to generate I and Q digital drive signals 128, 129 for the X-polarization to be converted by digital-to-analog converters (DACs) 130, 131 into I and Q analog drive signals 132, 133 for the X-polarization that, after amplification by respective amplifiers 134, 135 are used to drive the electrical-to-optical (E/O) modulator 112. The DSP 126 is operative to generate I and Q digital drive signals 136, 137 for the Y-polarization to be converted by DACs 138, 139 into I and Q analog drive signals 140, 141 for the Y-polarization that, after amplification by respective amplifiers 142, 143, are used to drive the E/O modulator 114. According to one example, each DAC has a sampling rate of 68 GS/s, and each amplifier has an analog bandwidth of greater than 34 GHz.

According to some examples, a memory of the transmitter 101 is configured to hold $\sim 2^{17}$ sample sets of (XI, XQ, YI, YQ) time-domain field instructions. According to some examples, readout of the contents of the transmit memory may be repeated indefinitely.

In some implementations, the DSP 126 and the DACs 130, 131, 138, 139 are comprised in a complementary metal-oxide-semiconductor (CMOS) module, and the amplifiers 134, 135, 142, 143 are comprised in a bipolar CMOS (BiCMOS) module.

An optical link 103 connecting the transmitter 101 to the receiver 105 comprises spans 146 of optical fiber which are coupled by optical amplifiers 148 for signal amplification. According to some examples, the spans 146 may be ~80 km in length. For simplicity, only three spans 146 and three optical amplifiers 148 are illustrated in the optical link 103. Typically, the number of spans 146 and the number of optical amplifiers 148 in an optical link is much larger.

The receiver 105 is configured to receive an optical signal 150 output by the optical link 103. The receiver 105 comprises a polarizing beam splitter 151 configured to split the received optical signal 150 into polarized components 152, 153, for example, orthogonally polarized components corresponding to an X polarization and a Y polarization, respectively. The receiver 105 comprises optical hybrids 154, 155 configured to process the polarized components 152,153 with respect to polarized components 156, 157 of a local optical signal 159 produced by a laser 160, where the local optical signal 159 is split into the polarized components 156, 157, for example, by a polarizing beam splitter 158. Where the optical hybrid 154 operates on the X polarization it may generate optical signals 161, 162 corresponding to dimensions XI, XQ, respectively, which denote the I and Q components of the X polarization. Where the optical hybrid 155 operates on the Y polarization it may generate optical signals 163, 164 corresponding to dimensions YI, YQ, respectively, which denote the I and Q components of the Y polarization. The optical signals 161,

162, 163, 164 may be converted by respective photodetectors 165, 166, 167, 168 into analog electrical signals. Together, elements such as the beam splitters 151, 158, the laser 160, the optical hybrids 154, 155, and the photodetectors 165, 166, 167, 168 may be referred to as a communication interface of the receiver 105. The analog electrical signals may be amplified by radiofrequency (RF) pre-amplifiers 169, 170, 171, 172, thereby resulting in respective amplified analog signals 173, 174, 175, 176. Analog-to-digital converters (ADCs) 177, 178, 179, 180 are configured to sample the analog signals 173, 174, 175, 176, respectively, and to generate digital signals 182, 184, 186, 188 corresponding to the dimensions XI, XQ, YI, YQ, respectively.

An application specific integrated circuit (ASIC) 190 is configured to apply digital signal processing to the digital signals 182, 184, 186, 188 using a digital signal processor (DSP) 192. According to some examples, the DSP 192 may perform equalization processing designed to compensate for a variety of channel impairments, such as CD, SOP rotation, PMD including group delay (GD) and differential group delay (DGD), PDL or PDG, and other effects. The DSP 192 may further perform carrier recovery processing, which includes calculating an estimate of carrier frequency offset (i.e., the difference between the frequency of the transmitter laser 102 and the frequency of the receiver laser 160). According to some examples, the DSP 192 may further perform operations such as multiple-output (MIMO) filtering, clock recovery, and FDM subcarrier de-multiplexing. The DSP 192 may further perform symbol-to-bit de-mapping (or decoding) using a decision circuit to generate signals 194 representative of bit estimates.

In some examples, the optical link 103 is a dispersion-uncompensated link and is characterized by a monotonic dispersion map. In other examples, the optical link 103 is a dispersion-compensated link and is characterized by a non-monotonic dispersion map. A dispersion-compensated link may employ in-line dispersion compensation or mid-stage access amplifiers, as described for example, in U.S. Pat. No. 9,960,843 to Shiner et al.

The ability to use commercial optical transceivers to perform fiber parameter interrogation before data transmission may be beneficial for system engineering, especially in open optical networks. Pump-probe measurements, such as those described by Shiner et al., may be a useful diagnostic for maintenance and upgrade activities on deployed cables, as well as for commissioning new cables.

According to the technology described herein, a polarization-multiplexed (PM) coherent receiver, such as the receiver 105, may be configured to generate an estimate of nonlinear phase shift in a multi-span fiber link, such as the link 103, based on pump and probe signals propagated over the link, where the pump and probe signals have been generated by a single PM coherent transmitter, such as the transmitter 101. In some examples, the actions of the transmitter and the receiver may be performed in a single transceiver.

The transmitter may be configured to transmit the pump signal on one polarization, and to transmit the probe signal on another polarization. For example, the probe signal may be transmitted on the X-polarization and the pump signal may be transmitted on the Y-polarization, or vice versa. In the examples described herein, the respective states of polarization (SOPs) of the pump and probe signals are orthogonal. However, alternative examples are contemplated wherein the respective SOPs of the pump and probe signals are non-orthogonal. In such cases, the non-orthogonality of the SOPs would need to be taken into account when interpreting any nonlinear phase estimates. The pump and probe signals may be designed such that a central frequency of the pump signal is separated from a central frequency of the probe signal, with a working spectrum of the transmitter (i.e., the spectrum used for data communication) being between the two central frequencies. Because the pump and probe signals are transmitted at different central frequencies, CD in each span of the link will cause the relative locations of the pump pulses and the probe pulses to change with respect to one another as they propagate. This may be referred to as temporal walk-off. As the combined dual-polarization wave vector propagates down the fiber, the pump pulses on one polarization may scan across the probe pulses on the other polarization. The speed at which the pump pulses move with respect to the probe pulses depends on the local CD. This scanning of the probe pulses with the pump pulses introduces a nonlinear interaction that causes a nonlinear phase shift in the probe pulses. Measurements of this nonlinear phase shift may be indicative of XPM between the pump and probe pulses. Depending on the properties of the pump pulses, it may be possible to measure one or both of accumulated nonlinear phase (i.e., a total phase shift experienced by the optical channel) and localized nonlinear phase (i.e., phase shifts that are spatially resolvable along the fiber). Measurements of accumulated nonlinear phase may be useful for system nonlinear distortion penalty budgeting. Measurements of localized nonlinear phase may also be used to reveal information about the number of amplified fiber spans in the link, and the CD of each span. In another example, nonlinear phase shift measurements may be indicative of fiber spot size which, in turn, may be used to identify fiber type. For a given power, a smaller spot size is expected to produce a larger nonlinear phase.

Using the proposed technology, the pump and probe signals may be implemented within the spectral occupancy of a single transmitter through subcarrier multiplexing, thereby enabling automatic and precise time synchronization. This offers a practical advantage over having to synchronize two separate transceivers for XPM measurements, as described by Shiner et al. in U.S. Pat. No. 9,960,843.

An additional benefit of the proposed technology is that it may use an average optical power that is similar to that required for normal operation in a WDM system, such that there is negligible interference to other channels.

Generating the pump and probe pulses at a single transmitter with relatively small frequency separation may ensure the orthogonality of the respective SOPs of the pump and probe signals. This orthogonality may be maintained for a large number of fiber spans as long as the second-order PMD is not too high.

Figure 2:
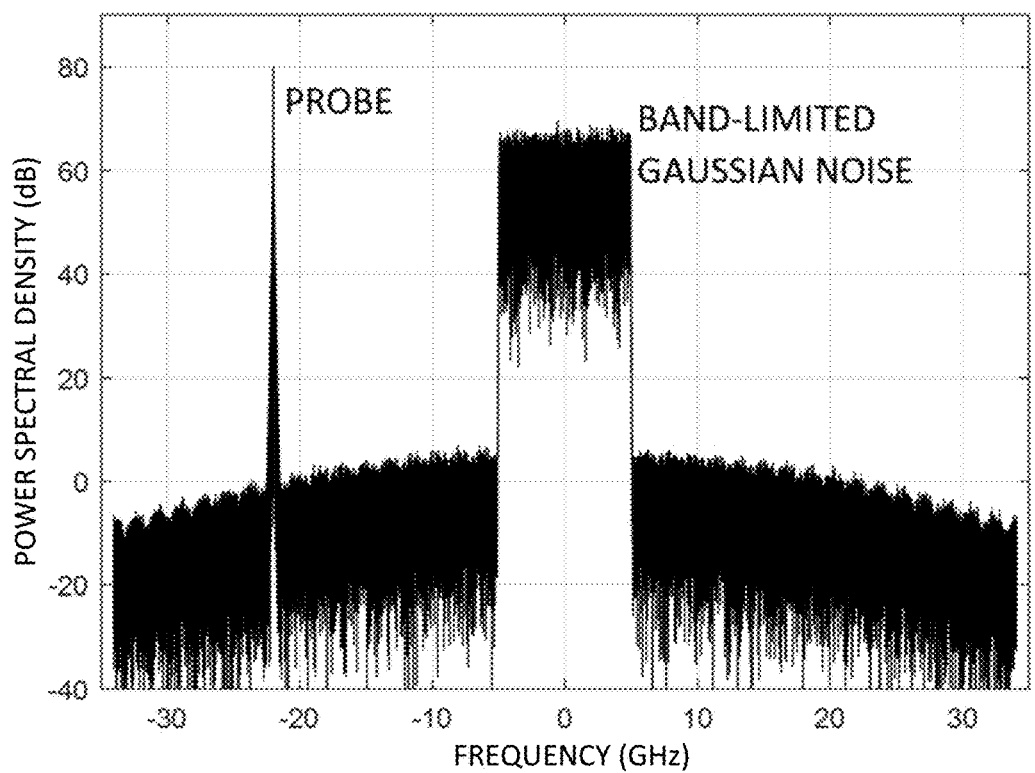
FIG. 2 illustrates a plot of power spectral density in decibels (dB) as a function of frequency in GHz of a probe signal in accordance with some examples of the proposed technology.
Figure 3:
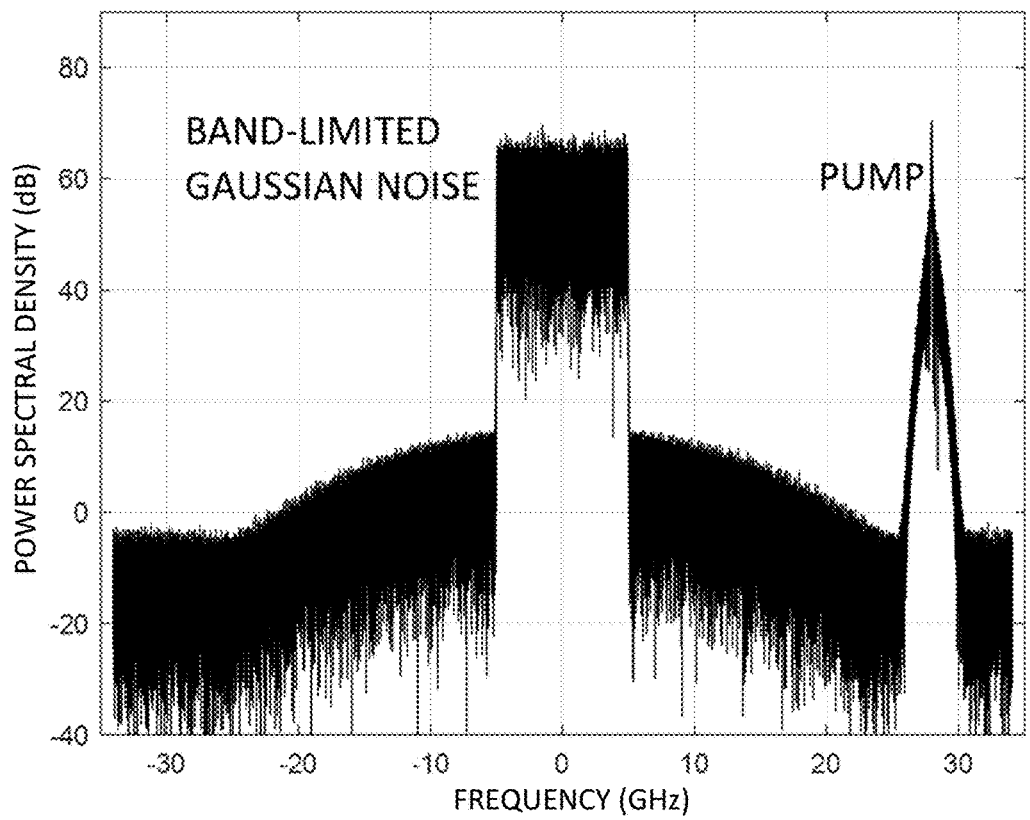
FIG. 3 illustrates a plot of power spectral density in dB as a function of frequency in GHz of a pump signal in accordance with some examples of the proposed technology.
Figure 4:
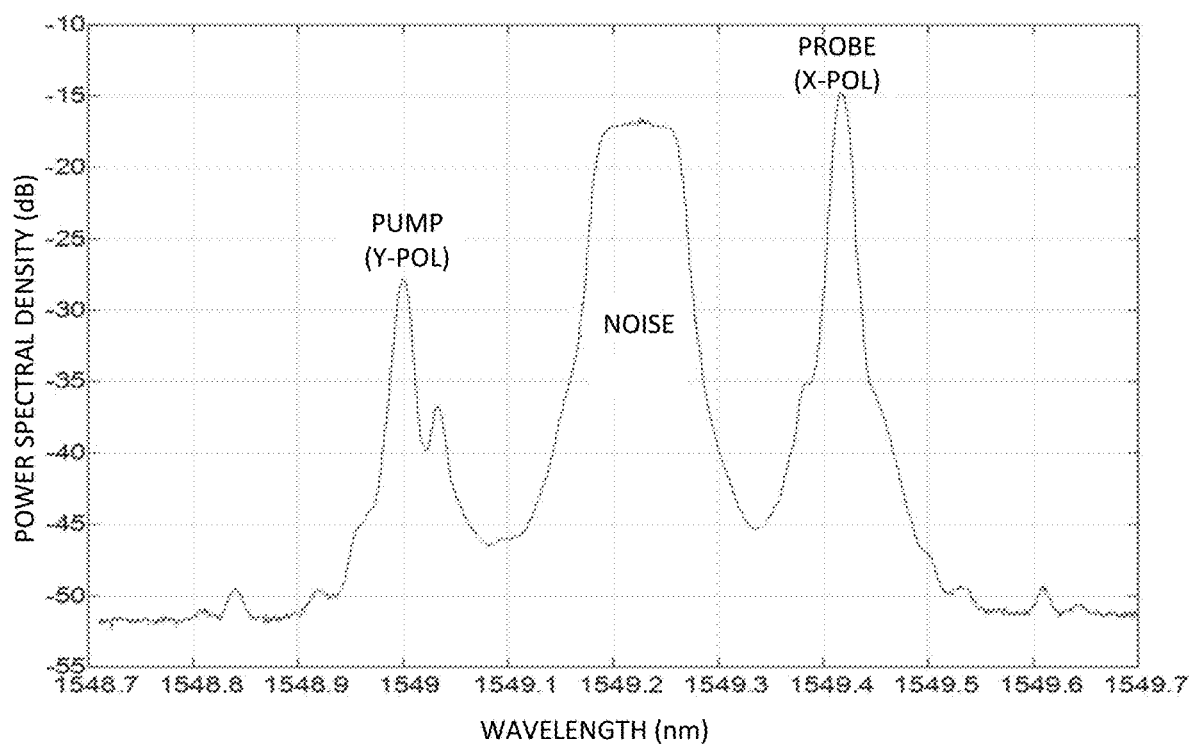
FIG. 4 illustrates a plot of power spectral density in dB as a function of wavelength in nm of a dual-polarization optical signal formed from the probe signal of FIG. 2 and the pump signal of FIG. 3, as measured by an optical spectrum analyzer at an output of a dual-polarization optical transmitter.

FIG. 2 illustrates a plot of power spectral density in decibels (dB) of an example probe signal as a function of frequency in GHz; FIG. 3 illustrates a plot of power spectral density in dB of an example pump signal as a function of frequency in GHz; and FIG. 4 illustrates a plot of power spectral density in dB as a function of wavelength in nm of a dual-polarization optical signal formed from the probe signal of FIG. 2 and the pump signal of FIG. 3, as measured at an output of a transmitter, such as the transmitter 101. Such a measurement might be made by an optical spectrum analyzer. According to one example, the probe signal may be generated by the E/O modulator 112 such that its frequency spectrum occupies the X-polarization, and the pump signal may be generated by the E/O modulator 114 such that its frequency spectrum occupies the Y-polarization.

In a commercial optical transmitter, feedback control of modulator bias relies on low-frequency components of the modulating signal, typically lower than 3 GHz. In order to maintain normal operating conditions of the transmitter and stability of the modulator bias control loop, the pump signal and the probe signal may each comprise low-frequency noise (up to ±3 GHz, for example), or alternatively, a high-order quadrature amplitude modulation (QAM) signal, for example, 16-QAM. In general, the pump and probe signals may be designed to comprise a low-frequency signal (e.g., <3 GHz) capable of maintaining stability of the bias voltage of the E/O modulators of the transmitter. In the event that alternative methods can be used to stabilize modulator bias without low-frequency signal components, examples are contemplated wherein the pump and probe signals may exclude such low-frequency components. According to the example illustrated in FIG. 2, the spectrum of the probe signal comprises a band-limited Gaussian noise peak and a probe pulse peak at a frequency of −22 GHz with respect to the suppressed optical carrier. As illustrated in FIG. 3, the pump signal comprises a band-limited Gaussian noise peak and a pump pulse peak at a frequency of +28 GHz with respect to the suppressed optical carrier. These are merely examples. Other peak frequencies and other spectral shapes may be used for the pump and probe pulses. A larger pump/probe frequency separation may help introduce more time walk-off between pump and probe pulses along the fiber due to CD, which may help to better resolve nonlinear phase distribution of different fiber spans. However, the maximum pump/probe frequency separation may be limited by the available bandwidth of the transmitter. According to some examples, the peak frequencies of the pump and probe pulses may be chosen to minimize potential pump-probe crosstalk due to the non-ideal opposite-sideband rejection of I/Q modulation. In the present example, the pump frequency is at +28 GHz and the probe frequency is at −22 GHz. Non-ideal opposite-sideband rejection of I/Q modulation may be caused by both delay imbalance and power imbalance of the I- and Q-ports of the E/O modulator. As a result, a small amount of pump signal may be leaked to −28 GHz, which is 6 GHz away from the probe frequency of −22 GHz. The effect of this leakage may be filtered out by a digital bandpass filter which only selects the probe frequency.

In the example of FIGS. 2 and 3, the probe pulse peak and the pump pulse peak are separated by 50 GHz. As shown in FIG. 4, this corresponds to a wavelength difference of approximately 0.4 nm. That is, given a signal wavelength $\lambda$=1550 nm, and a frequency separation $\Delta f$=50 GHz, the corresponding wavelength separation is $\Delta\lambda$=−$\lambda^2\Delta f/c$≈0.4 nm, where c denotes the speed of light. As transmitter spectral occupancy increases to drive down transport cost per Gb, it is contemplated that the spectral separation between the frequencies of the pump and probe pulses could be increased to improve localization of the origin of nonlinear phase.

Figure 5:
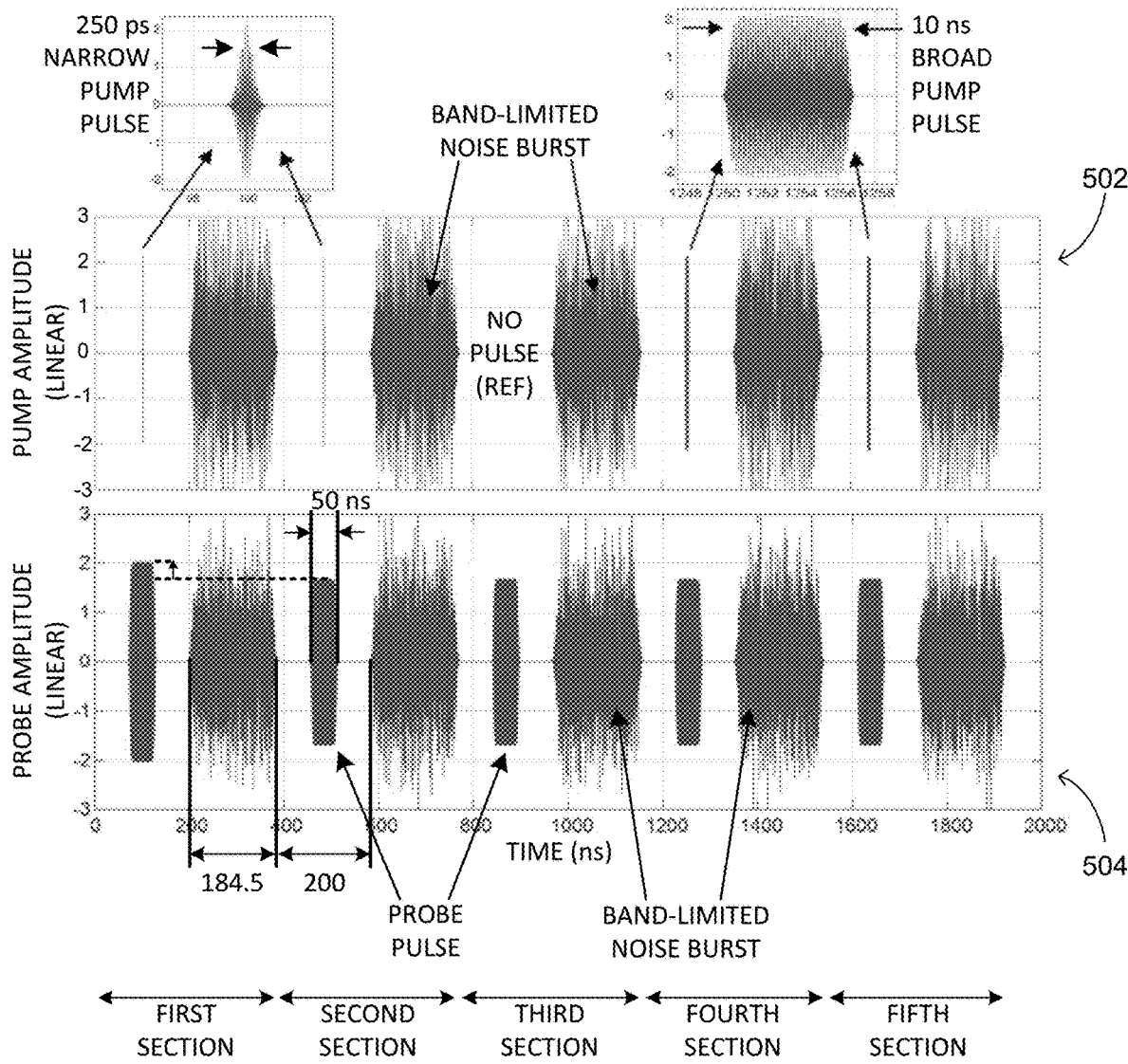
FIG. 5 illustrates a plot of amplitude in linear units as a function of time in ns of a pump waveform and a probe waveform loaded into a dual-polarization coherent optical transmitter in accordance with some examples of the proposed technology.

FIG. 5 illustrates a plot of amplitude in linear units as a function of time in ns of an example pump waveform 502 and an example probe waveform 504 loaded onto the E/O modulators of an optical transmitter.

The pump waveform 502 and the probe waveform 504 may be generated in a transmitter, such as the transmitter 101, having a memory capable of holding dual-polarization waveforms of length 1925 ns. Each of the waveforms 502, 504 comprises five sections, each section having a duration of 384.5 ns. Within each section of the pump waveform 502, a subsection of duration 200 ns comprises either a pump pulse or a reference signal (an empty period with no pulse), and the remaining subsection of duration 184.5 ns comprises band-limited Gaussian noise. Within each section of the probe waveform 504, a subsection of duration 200 ns comprises a probe pulse, and the remaining subsection of duration 184.5 ns comprises band-limited Gaussian noise.

In this example, the pump waveform 502 comprises two types of pump pulses which are respectively referred to as "narrow" pump pulses and "broad" pump pulses. In this example, each narrow pump pulse comprises a Gaussian pulse with a full width at half maximum (FWHM) duration of 250 ps that is centered within its respective 200-ns subsection, and each broad pump pulse comprises a tenth-order super-Gaussian pulse with a FWHM duration of 10 ns that is centered within its respective 200-ns subsection. The example pump waveform 502 also includes a 200-ns subsection that does not comprise any pulse. The pump signal during this empty period may be referred to as the pump reference signal, and it may be used for probe phase calibration in order to minimize the impact of random phase variation due to laser phase noise. In the example of FIG. 5, each one of the five sections of the pump waveform 502 begins with the 200-ns subsection comprising either the narrow pump pulse, the broad pump pulse, or the reference signal, and each one of the five sections ends with the 184.5-ns subsection comprising the band-limited Gaussian noise. The first section and the second section each include the narrow pump pulse; the third section includes the pump reference signal (i.e., the empty period); and the fourth section and the fifth section each include the broad pump pulse. In other words, the pump pulses (and the pump reference signal) are interleaved with the noise bursts.

Each section of the probe waveform 504 begins with a 200-ns subsection comprising a broad tenth-order super-Gaussian probe pulse with a FWHM duration of 50 ns that is centered within the 200-ns subsection, and each section ends with a 184.5-ns subsection comprising band-limited Gaussian noise. Each noise subsection of the probe waveform 504 overlaps in time with a respective noise subsection of the pump waveform 502. Each probe pulse of the probe waveform 504 (except the one in the third section) overlaps in time with a respective pump pulse of the pump waveform 502. As noted in the example of FIG. 5, the probe pulse in the third section coincides in time with the pump reference signal (i.e., the empty period).

According to some examples, the probe pulse in one of the five sections of the probe waveform 504 may be distinguished from the probe pulses in the remaining four sections in order to frame the sequence of pulses in the probe waveform 504. For example, as illustrated in FIG. 5, the probe pulse in the first section may be launched at a slightly higher power (e.g., ~10% or 20% higher) than the probe pulses in the second, third, fourth, and fifth sections. At the receiver, the higher power indicates the beginning of the sequence of five probe pulses contained in the probe waveform 504. By distinguishing one of the probe pulses from the other probe pulses in the probe waveform 504, and by using knowledge about the sequence of pulses in the pump waveform 502, it is possible to identify, for each receiver-detected probe pulse, whether that probe pulse has experienced an interaction with a narrow pump pulse, a broad pump pulse, or an empty period.

In general, pump and probe waveforms may be designed such that the zero-field regions on either side of the pump and probe pulses are wide enough to substantially avoid temporal overlap with the noise bursts due to CD or CD pre-compensation.

The arrangement of pump pulses, probe pulses, noise bursts, and the empty period in the pump and probe waveforms 502, 504 is merely one example. Other examples are contemplated. For example, instead of each section beginning with a pump (or probe) pulse and ending with a noise burst, each section could alternatively begin with a noise burst and end with a pump (or probe) pulse. Additionally, instead of the pulses in the pump waveform 502 being arranged in the pulse sequence 1) narrow pulse, 2) narrow pulse, 3) no pulse, 4) broad pulse, 5) broad pulse, the pulses could be rearranged in any other desired order. Additionally, the pump waveform 502 and the probe waveform 504 may each comprise fewer than five sections or more than five sections.

The properties of the pump pulses, the probe pulses, and the noise bursts used in the waveforms 502, 504 are merely examples. Other properties or types of pulses are contemplated. In one example, the pump waveform 502 may comprise alternative and/or additional types of pump pulses to those illustrated in FIG. 5. In one example, the pump waveform 502 may comprise a first noise burst, an empty period, and a pump pulse having a first frequency, and the probe waveform 504 may comprise a second noise burst and at least two probe pulses, each probe pulse having a second frequency that differs from the first frequency, wherein the first noise burst is designed to overlap in time with the second noise burst, wherein the empty period is designed to overlap in time with one of the probe pulses, and wherein the pump pulse is designed to overlap in time with another one of the probe pulses.

The pump waveform 502 and the probe waveform 504, stored in the transmitter memory, may be repeated for a period of time (or indefinitely) by the transmitter, thereby resulting in two parallel electrical signals that may be used to modulate two optical subcarriers having different polarizations. The two modulated optical subcarriers may be used to generate a dual-polarization optical signal that is launched into a fiber link, such as the link 103. Following transmission through the amplified spans of the link, the complex optical field of the probe waveform 504 may be selectively detected at a coherent receiver, such as the receiver 105. According to some examples, the launching and detection of the pump and probe waveforms may be performed offline.

The optical field detected at the receiver may be analyzed to determine that part of the field that is due to the Kerr effect or FWM. For example, measurements of the nonlinear phase shift of probe pulses due to pump pulses are indicative of the XPM.

Figure 6:
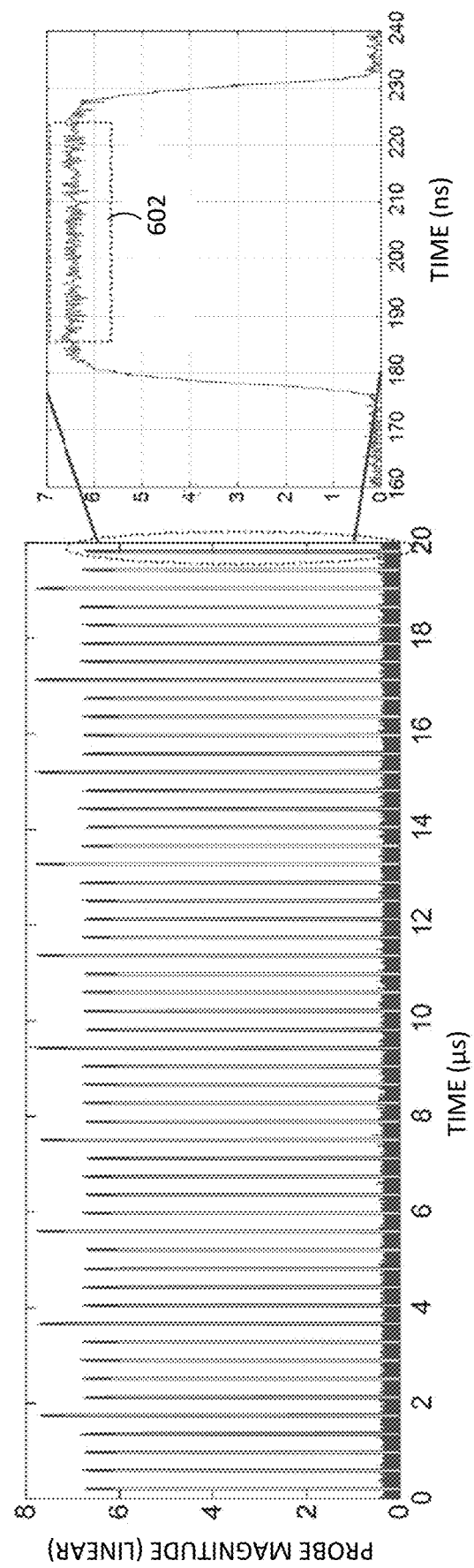
FIG. 6 illustrates a plot of magnitude in linear units over time in μs (or ns for the inset magnified section) of a probe signal as detected at a coherent receiver in accordance with some examples of the proposed technology.

FIG. 6 illustrates a plot of magnitude in linear units over time in μs of a probe signal detected at a coherent receiver, such as the receiver 105, according to some examples. An inset magnified section shows the magnitude in linear units over time in ns.

According to some examples, one or more phase measurements may be performed over a selected period of time for each probe pulse detected at the receiver. For example, the period of time may exclude 5 ns at the beginning and end of each 50-ns probe pulse, such that phase measurements are performed over the substantially flat region 602 of each probe pulse. According to some examples, multiple phase measurements may be averaged. Phase shifts in the probe pulses may result from collisions or interactions with the pump pulses. The phase measurements may be used to glean information about XPM between the respective subcarriers of the pump and probe signals. The phase measurements may also provide information about the number of amplified fiber spans in the link, and the CD in each span. The type of pump pulses that collide or interact with the probe pulses may determine or impact the type of information that can be gleaned.

Based on the pump waveform 502 and the probe waveform 504 of FIG. 5, there are three kinds of pump-probe interactions that may be observed in the probe signal detected at the receiver over the link. A Type-N interaction is one that occurs when a narrow pump pulse interacts with a probe pulse. A Type-B interaction is one that occurs when a broad pump pulse interacts with a probe pulse. A Type-R interaction is one that occurs when the pump reference signal interacts with a probe pulse. A measurement of phase shift of a probe pulse due to pump-probe interactions (which may provide a measure of XPM) may be determined by subtracting the phase of Type-R interactions from the phase of Type-N (or Type-B) interactions.

Figure 7:
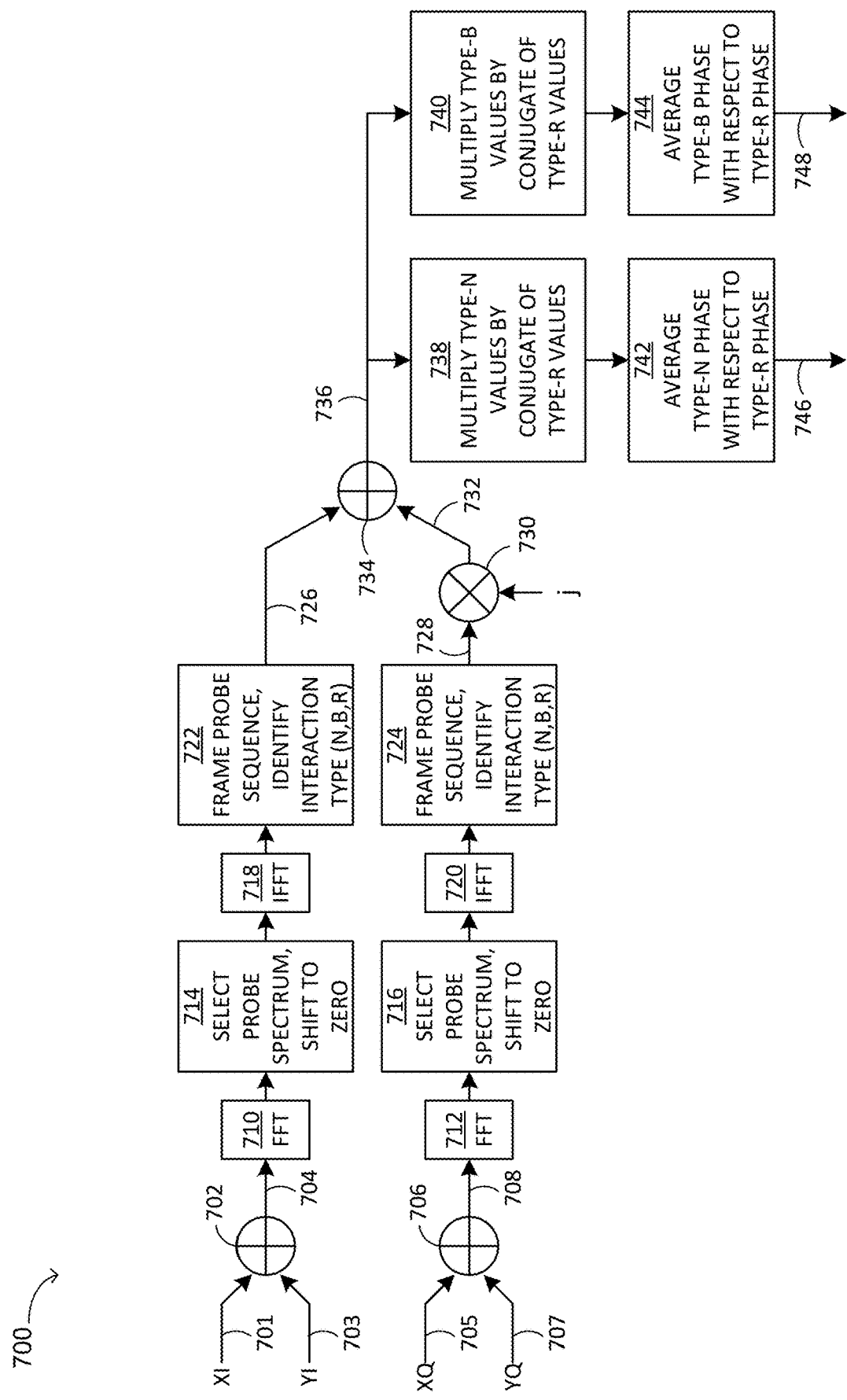
FIG. 7 illustrates a block diagram of processing for estimating pump-induced nonlinear phase shift of receiver-detected probe pulses in accordance with some examples of the proposed technology.

FIG. 7 illustrates a block diagram of example digital signal processing 700 for estimating pump-induced nonlinear phase shift of probe pulses detected at a receiver, such as the receiver 105. For example, the digital signal processing 700 may be implemented by the DSP 192.

According to some examples, digital signals sampled over a period of time may be stored in a memory of the receiver. For example, referring to FIG. 1, the digital signals 182, 184, 186, 188 representing the XI, XQ, YI, YQ signals, respectively, may be stored over a period of time for use by the DSP 192 in performing estimation of nonlinear phase shift. During an out-of-service period, the receiver may be configured to download from its memory, for example, a set of $2^{17}$ detected samples. In FIG. 7, the set of XI samples and the set of YI samples are denoted by 701 and 703, respectively, while the set of XQ samples and the set of YQ samples are denoted by 705 and 707, respectively.

A summation operation 702 may be applied to the set of XI samples 701 and the set of YI samples 703, thereby resulting in an I record 704 comprising a set of I samples. Another summation operation 706 may be applied to the set of XQ samples 705 and the set of YQ samples 707, thereby resulting in a Q record 708. Together, the two records of samples 704, 708 are equivalent to one record of time-domain samples of complex field values. The records 704, 708 may be transformed to the frequency domain using respective fast Fourier transform (FFT) operations 710, 712. In order to isolate the samples of interest (i.e., the probe samples), the frequency-domain samples output by the FFT operations 710, 712 may undergo respective operations 714, 716 configured to set to zero all samples except for those of the probe spectrum, and to shift the center of the probe spectrum to a frequency of zero. The probe spectrum may be selected using a digital bandpass filter. The choice of bandwidth for the bandpass filter may be based on the frequencies of the pump and probe pulses, and the types of interactions to be observed in the receiver-detected probe pulses. If the bandwidth of the bandpass filter is too narrow, the receiver-detected pulses associated with Type-N interactions may become broad enough that they can no longer be used to distinguish different spans in the optical link. If the bandwidth of the bandpass filter is too broad, the probe spectrum may start to include leakage from the pump signal, which is 6 GHz away in the previous example. According to one example, where the pump frequency is +28 GHz and the probe frequency is −22 GHz, the bandpass filter may be designed to have a FWHM bandwidth of 6 GHz such that it accommodates for XPM induced by the narrow pump pulses. If only XPM induced by broad pump pulses is of interest then the bandpass filter may be designed to have a must narrower bandwidth, for example <1 GHz, in order to help reject leakage from the pump signal.

The outputs of the operations 714, 716 comprise two records of real numbers which together represent a set of complex samples (for example, $2^{17}$) corresponding to the frequency-centered, zero-padded probe spectrum. The records may be transformed to the time domain using respective inverse FFT (IFFT) operations 718, 720. The time-domain probe records may undergo respective operations 722, 724 configured to frame the probe sequence, thereby identifying for each probe pulse which type of interaction that pulse was subjected to (for example, a Type-N interaction, a Type-B interaction, or a Type-R interaction). Referring to the probe waveform 504, the operations 722, 724 may comprise framing the sequence of five probe pulses by identifying the probe pulse having the higher power as the first probe pulse in the sequence. The operations 722, 724 may further comprise using knowledge of the pump waveform 502 to identify that the first and second probe pulses were subjected to a Type-N interaction, that the third probe pulse was subjected to a Type-R interaction, and that the fourth and fifth probe pulses were subjected to a Type-B interaction. For example, the operations 722, 724 may comprise sorting probe waveforms associated with Type-N, Type-B, and Type-R interactions into different rows of a data matrix for further analysis based on their respective timeslots, where timeslots 1-2 are for Type-N; timeslot 3 is for Type-R; and timeslots 4-5 are for Type-B. The operations 722, 724 may be repeated many times. The operation 722 generates a plurality of real time-domain samples 726 corresponding to the I component of probe field, while the operation 724 generates a plurality of real time-domain samples 728 corresponding to the Q component of the probe field. A multiplication operation 730 may be applied between the time-domain samples 728 and a complex value j, thereby resulting in a plurality of complex values 732. An addition operation 734 may be used to combine the complex values 732 with the respective real values 726, thereby resulting in a plurality of complex time-domain samples 736 representing the probe field.

Each probe field sample 736 comprises a complex value $E_k$ representing the complex probe field at a sampling time t, expressed in Equation 1 as:

$$E_k(t) = A_{k,R}(t) + jA_{k,I}(t), \quad [1]$$

where k=N, B, R represents samples associated with Type-N, Type-B, and Type-R interactions, respectively, where $A_{k,R}$ and $A_{k,I}$ are real and imaginary parts of the sampled field, and where $j=\sqrt{-1}$. The optical phase Ok of the sampled probe field $E_k$ at the sampling time t is expressed in Equation 2 as:

$$\theta_k(t) = \tan^{-1}[A_{k,I}(t)/A_{k,R}(t)]. \quad [2]$$

According to some examples, those of the samples 736 that are associated with Type-N interactions may be multiplied by the complex conjugate of those of the samples 736 that are associated with Type-R interactions, as shown at 738. Accordingly, operation 738 may enable the calculation of $\theta_N(t)-\theta_R(t)$ from the product of $E_N(t)$ and the complex conjugate of $E_R(t)$. Because there is no pump pulse during the timeslots associated with Type-R interactions, $\theta_R(t)$ only represents the laser phase noise, which may vary slowly. Assuming that laser optical phase variation is much slower than the time of each data frame, the calculation of $\theta_N(t)-\theta_R(t)$ may help to eliminate the impact of laser phase noise and determine the nonlinear phase shift on the probe pulses caused by the narrow pump pulse. The values of $\theta_N(t)-\theta_R(t)$ calculated at 738 may be averaged across repeated received probe records, as shown at 742. This averaging may remove phase noise contributions from ASE and inter-channel nonlinearity.

According to some examples, the samples 736 may additionally or alternatively undergo another operation 740, similar to the operation 738, in order to calculate $\theta_B(t)-\theta_R(t)$. Specifically, those of the samples 736 that are associated with Type-B interactions may be multiplied by the complex conjugate of those of the samples 736 that are associated with Type-R interactions. Multiplying $E_B(t)$ with the complex conjugate of $E_R(t)$ enables the calculation of $\theta_B(t)-\theta_R(t)$, which represents the nonlinear phase shift on the probe pulses caused by the broad pump pulses. The values of $\theta_B(t)-\theta_R(t)$ calculated at 740 may be averaged across repeated received probe records, as shown at 744.

As a result of the digital signal processing 700, the receiver may generate estimates of nonlinear phase shift associated with one or more types of pump-probe interactions. Type-N interactions may be used to generate an estimate 746 of localized nonlinear phase shift (e.g., per span). Type-B interactions may be used to generate an estimate 748 of aggregate nonlinear phase shift (e.g., over multiple spans).

According to some examples, the receiver may be configured to operate in a first mode (e.g., a "phase measurement" mode) in which the contents of the memory are processed to generate the localized nonlinear phase estimate 746 or the aggregate nonlinear phase estimate 748, or both, as described previously, and the receiver may also be configured to operate in a second mode (e.g., a "data acquisition" mode) in which transmitted bits are recovered from the signals output by the ADCs. According to some examples, the two modes may be exclusive. According to other examples, the two modes may proceed simultaneously. According to one example, the pump and probe spectra may usurp or replace a part of the transmission spectrum, and the transceiver may be operated at a reduced data throughput (consistent with the remainder of the modem spectrum).

Figure 8:
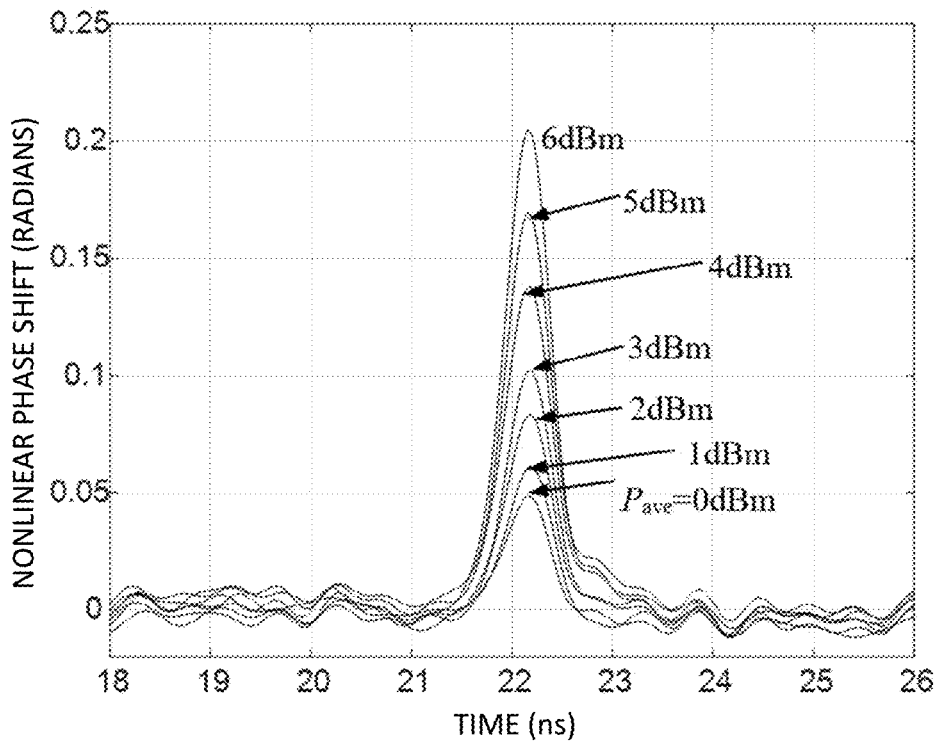
FIG. 8 illustrates a plot of measured nonlinear phase shift in radians as a function of time in ns of receiver-detected probe pulses associated with Type-N interactions, where each curve represents a different average power in dBm of the optical signal in accordance with some examples of the proposed technology.
Figure 9:
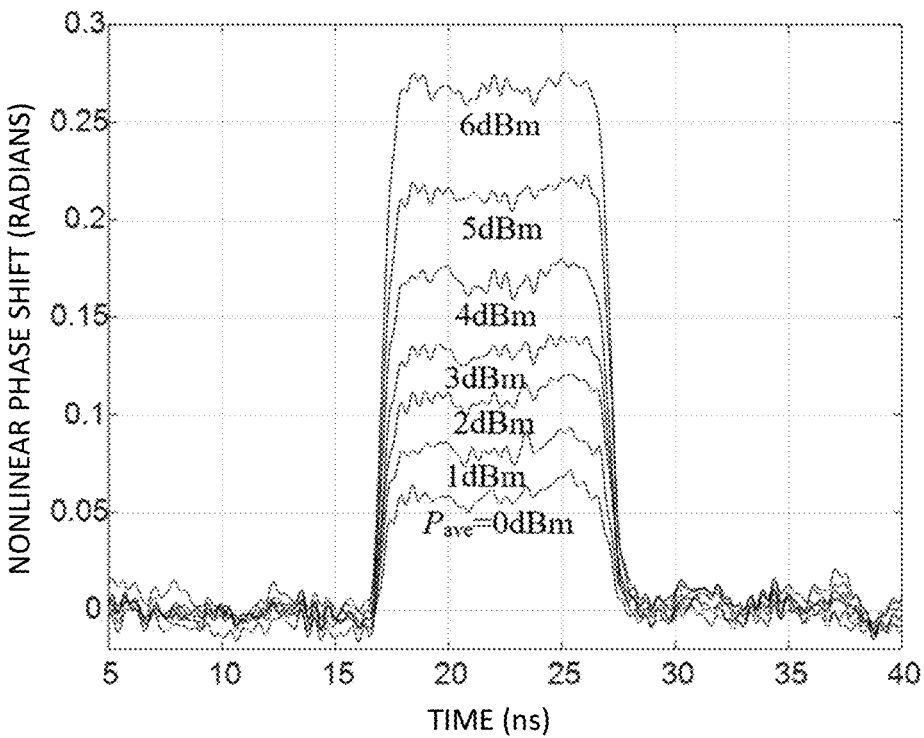
FIG. 9 illustrates a plot of measured nonlinear phase shift in radians as a function of time in ns of receiver-detected probe pulses associated with Type-B interactions, where each curve represents a different average power in dBm of the optical signal in accordance with some examples of the proposed technology.
Figure 10:
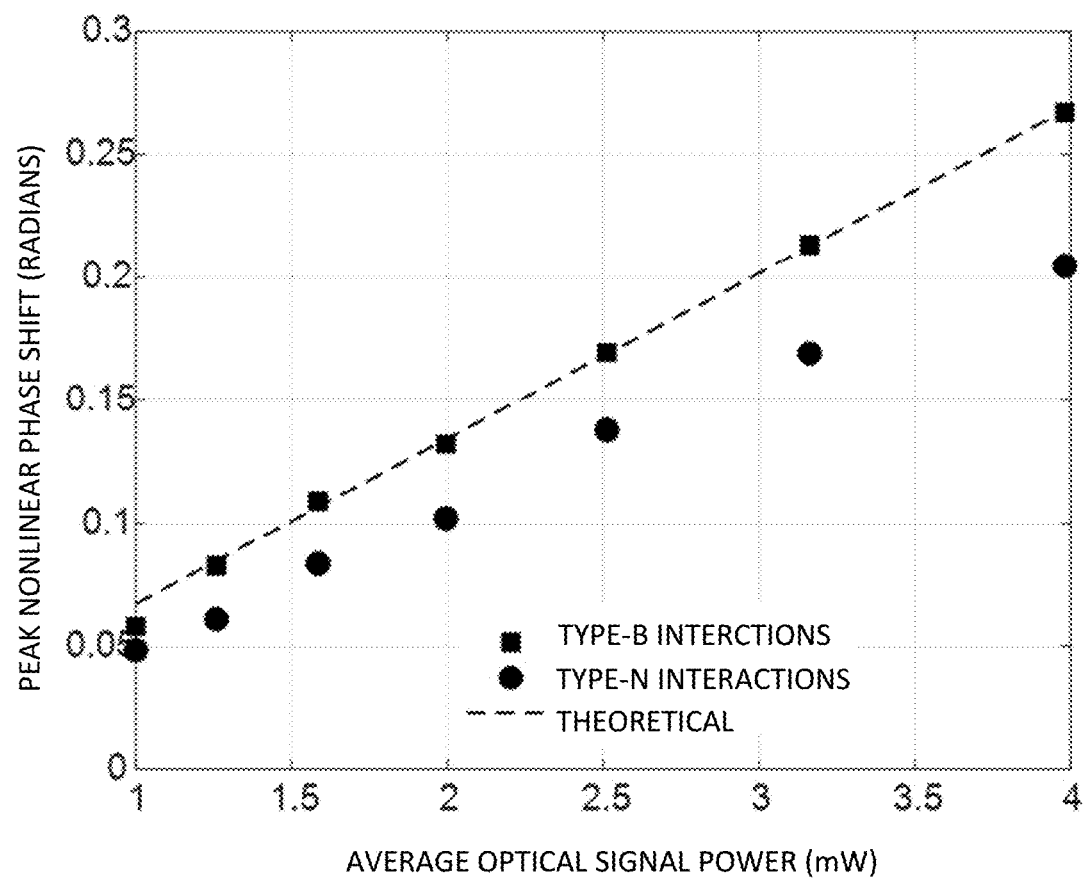
FIG. 10 illustrates a plot of peak nonlinear phase shift in radians as a function of average optical signal power in mW for Type-N interactions and Type-B interactions in accordance with some examples of the proposed technology.

FIGS. 8, 9, and 10 illustrate experimental results obtained in a communication system comprising a coherent transmitter, such as the transmitter 101, coupled to a coherent receiver via a link comprising a single span with a standard single mode fiber of length 101.29 km. The transmitter was configured to generate pump and probe signals based on the waveforms 502, 504 illustrated in FIG. 5. The receiver was configured to detect and process probe signals received over the link and to provide measurements of nonlinear phase shift, including localized nonlinear phase shift based on Type-N interactions and aggregate nonlinear phase shift based on Type-B interactions. The experimental results shown in FIGS. 8, 9, and 10 were obtained using a modified version of the receiver 105 in conjunction with a polarization controller. The polarization controller was placed in front of the modified receiver to ensure selective detection of the probe signal. In contrast to the receiver 105, which is configured for detection of two polarizations, the modified receiver was configured for detection of a single polarization, such that the signal output by the polarization controller was input directly to the X optical hybrid 154, for example, thereby resulting in only two analog output signals 173, 174 corresponding the XI and XQ dimensions, respectively. The modified receiver was configured for heterodyne detection, with the local oscillator in the receiver being tuned to the vicinity of the probe, such that the pump frequency was too far away from the probe frequency to be detectable by the modified receiver. According to the processing 700, the nonlinear phase shift measurements shown in FIGS. 8 and 9 are calibrated using receiver-detected probe pulses associated with Type-R interactions. The measurements shown in FIGS. 8, 9, and 10 are based on an average of 20 repeated records, each comprising two Type-N interactions and two Type-B interactions.

FIG. 8 illustrates a plot of measured nonlinear phase shift in radians as a function of time in ns of receiver-detected probe pulses associated with Type-N interactions. FIG. 9 illustrates a plot of measured nonlinear phase shift in radians as a function of time in ns of receiver-detected probe pulses associated with Type-B interactions. The measurements in each plot were made for different average optical signal power ($P_{ave}$) levels launched into the link (including both the pump and probe signals), in units of decibel-milliwatt (dBm). FIGS. 8 and 9 demonstrate that nonlinear phase shift is linearly proportional to the optical power.

FIG. 10 illustrates a plot of peak nonlinear phase shift in radians as a function of average optical signal power in units of mW, for Type-N interactions (circles) and for Type-B interactions (squares). The maximum value $P_{ave}$=6 dBm in FIGS. 8 and 9 is equivalent to the maximum value $P_{ave}$=4 mW in FIG. 10. In the case of Type-B interactions, the peak nonlinear phase represents the average value over the substantially flat portion of each curve in FIG. 9, while avoiding transition regions on either side of the broad pulse. In this example, 70% of the total pulse width was considered to be substantially flat, and values from the initial 1.5 ns and the final 1.5 ns of the 10-ns pulse were excluded from the average. The dashed line represents the theoretical phase shift $\varphi_{NL}$ in radians as a function of average optical signal power in mW, which may be calculated according to Equation 3:

$$\varphi_{NL}=(8/9)\gamma P_{pump}(0)L_{eff},\quad [3]$$

where $\gamma$ denotes a nonlinear parameter equal to $(2 \cdot \pi \cdot n_2)/(A_{eff} \cdot \lambda)$, where $n_2$ denotes the nonlinear-index coefficient in the nonlinear part of the refractive index (which may be weakly dependent on the germanium concentration of the core), where $A_{eff}$ denotes the effective area or fiber spot size, where $\lambda$ denotes the laser wavelength, where $P_{pump}(0)$ denotes the peak power of the input pump pulse, and where $L_{eff}$ denotes the effective nonlinear length of the fiber. For a single mode fiber and a laser wavelength $\lambda$=1550 nm, $\gamma$~1.32 $W^{-1}km^{-1}$. Given a fiber loss of $\alpha_{dB}$=0.2 dB/km (equivalent to $\alpha$=0.0461 Neper/km), the effective nonlinear length is $L_{eff}$=1/$\alpha$=21.5 km. The factor of 8/9 is due to the orthogonal SOPs of the pump and probe signals, which reduces the nonlinear coefficient according to the Manakov-PMD equation, as described by Marcuse et al. in "Application of the Manakov-PMD equation to studies of signal propagation in optical fibers with randomly varying birefringence", *Journal of Lightwave Technology*, vol. 15, p. 1735, 1997.

The peak power of the pump pulse $P_{pump}(0)$ may be expressed as a function of the average optical signal power $P_{ave}$ in mW according to Equation 4:

$$P_{pump}(0)=C \cdot P_{ave},\quad [4]$$

where C is a positive real number that acts as a conversion factor between $P_{pump}(0)$ and $P_{ave}$, where C reflects the shapes of the pump and probe waveforms. For the pump pulses used in the examples described thus far, the shapes of the waveforms are such that a C=2.96, meaning that an optical signal having an average power of $P_{ave}$=1 mW will have a peak pump pulse power of $P_{pump}(0)$=2.96 mW. This factor of 2.96 is accounted for when using Equation 3 to calculate the theoretical phase shift $\varphi_{NL}$ for a given value of $P_{ave}$.

The plot in FIG. 10 demonstrates a linear relationship between pump pulse average power and peak nonlinear phase shift for Type-B interactions, and a monotonic relationship between pump pulse average power and peak nonlinear phase shift for Type-N interactions. It is apparent from the theoretical curve that the measured peak nonlinear phase shift associated with the Type-B interactions provides an accurate prediction of the expected nonlinear phase shift $\varphi_{NL}$. In contrast, the measured peak nonlinear phase shift associated with the Type-N interactions is an underestimate of the expected nonlinear phase shift $\varphi_{NL}$. According to one example, integration of the curves shown in FIG. 8, rather than the peak values, may better correspond to the theoretical nonlinear phase shift $\varphi_{NL}$. Alternatively, a calibration may be applied to the measured peak values to better estimate the relationship between nonlinear phase shift and average optical signal power.

According to some examples, probe pulses associated with Type-N interactions may be helpful to estimate relative power levels of different fiber spans and CD of each span in a multi-span system, as will be described further. In order to demonstrate the application of the proposed technique in a multi-span fiber system, a single optical fiber may be placed inside a re-circulating loop to mimic a multi-span system. Each circulation or orbit of the loop imitates an additional amplified fiber span. For example, the signal observed after ten orbits of the loop may be used to mimic the signal observed after transmission through a 10-span link.

Figure 11:
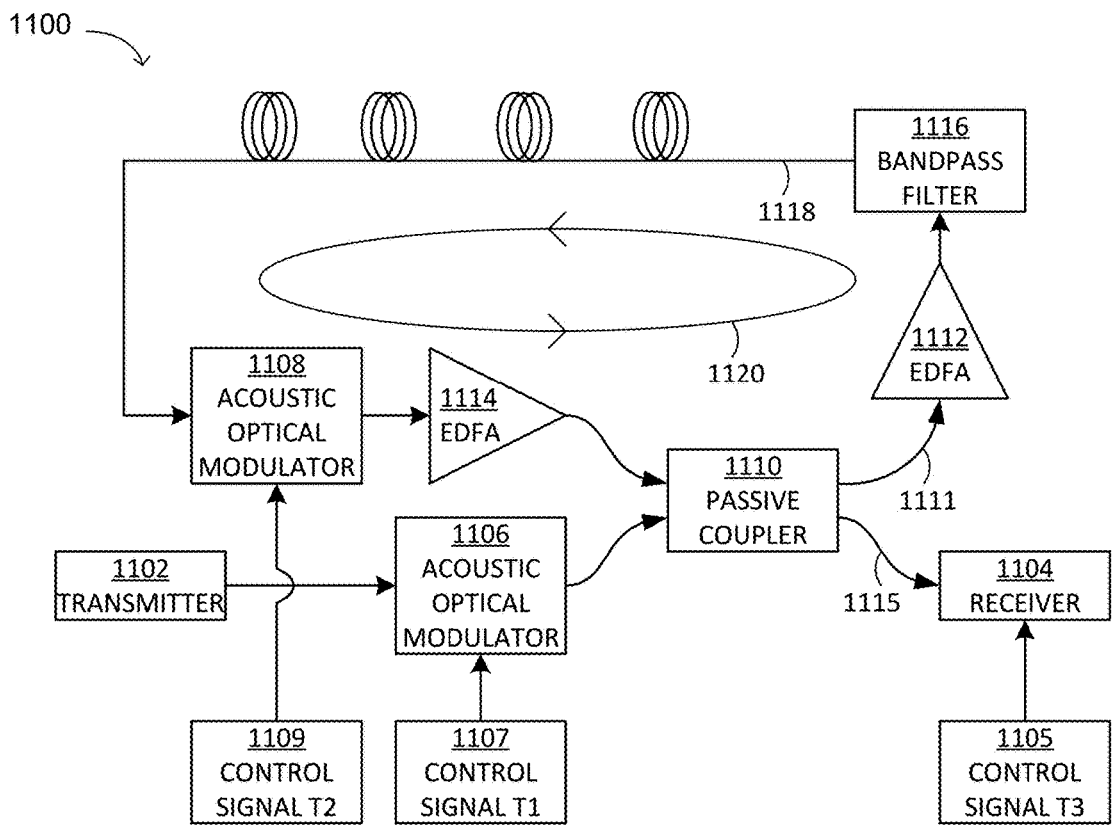
FIG. 11 illustrates a block diagram of a re-circulating loop system for imitating a link comprising multiple fiber spans in accordance with some examples of the proposed technology.

FIG. 11 illustrates a block diagram of an example re-circulating loop system 1100 for imitating a link comprising multiple fiber spans.

The system 1100 comprises a transmitter 1102 which is configured to send a dual-polarization optical signal comprising pump and probe pulses to an acoustic optical modulator (AOM) 1106. The AOM 1106 is controlled by a control signal T1 1107, which may cause the AOM 1106 to be in an "on" or "open" position for a certain period of time, thereby effectively acting as a short circuit and passing the optical signal from the transmitter 1102 into a loop 1120 via a 2×2 passive coupler 1110. The loop 1120 follows a path from the passive coupler 1110, to another EDFA 112, to a bandpass filter 1116, to a single mode optical fiber 1118, to another AOM 1108, to another EDFA 1114, and back to the passive coupler 1110. According to one example, where the loop 1120 has a time delay of 500 µs, the AOM 1106 may be configured by the control signal T1 1107 to be in the "on" position for a period of 500 µs. The passive coupler 1110 passes the optical signal, via a path 1111, to the EDFA 1112, which amplifies the optical signal and sends it through the bandpass filter 1116. The filtered signal then propagates through the single mode optical fiber 1118.

While the optical signal is traveling the length of the fiber 1118, the control signal T2 1109 may cause the AOM 1108 to be in an "off" or "closed" position, thereby effectively acting as an open circuit and preventing the optical signal from being transmitted to the EDFA 1114.

When the control signal T1 1107 causes the AOM 1106 to switch to the "off" position (e.g., after 500 µs), the control signal T2 1109 may simultaneously cause the AOM 1108 to switch to the "on" position for a period of time, thereby passing the propagated optical signal to the EDFA 1114. According to one example, in order to observe ten orbits of the loop 1120, the AOM 1108 may be configured by the control signal T2 1109 to pass the propagated optical signal to the EDFA 1112 for a period of 5000 µs. The passive coupler 1110 may be configured to output a portion of the amplified signal from the EDFA 1114 to the receiver 1104 via a path 1115, and the remaining portion may be passed back to the EDFA 1112 via the path 1111 for an additional orbit of the loop 1120. This process is repeated until the control signal T2 1109 causes the AOM 1108 to switch to the "off" position.

The receiver 1104 is controlled by a control signal T3 1105, which determines when the signal output from the loop 1120 is to be processed. The time at which the receiver 1104 is configured to start processing signals may be based on the width or duration of the pulse input by the transmitter 1102 into the loop 1120, and the number of orbits to be observed. For example, if the optical signal generated by the transmitter 1102 was input into the loop 1120 for a period of 500 µs, and ten orbits of the loop 1120 is expected to take 5000 µs, then the receiver 1104 may be configured by the control signal T3 1105 to begin measuring the received signals at 5250 µs to catch the last 250 µs of the tenth orbit. According to one example, the control signal T3 1105 may cause the receiver 1104 to acquire signal measurements for a period of 250 µs.

FIGS. 12, 13, 14, 16, and 17 illustrate experimental results obtained using the system 1100 with a standard single mode fiber of length L=101.29 km, a fiber dispersion parameter D=16.1 ps/nm/km at the signal wavelength, and a pump/probe wavelength separation Δλ=0.4 nm.

Figure 12:
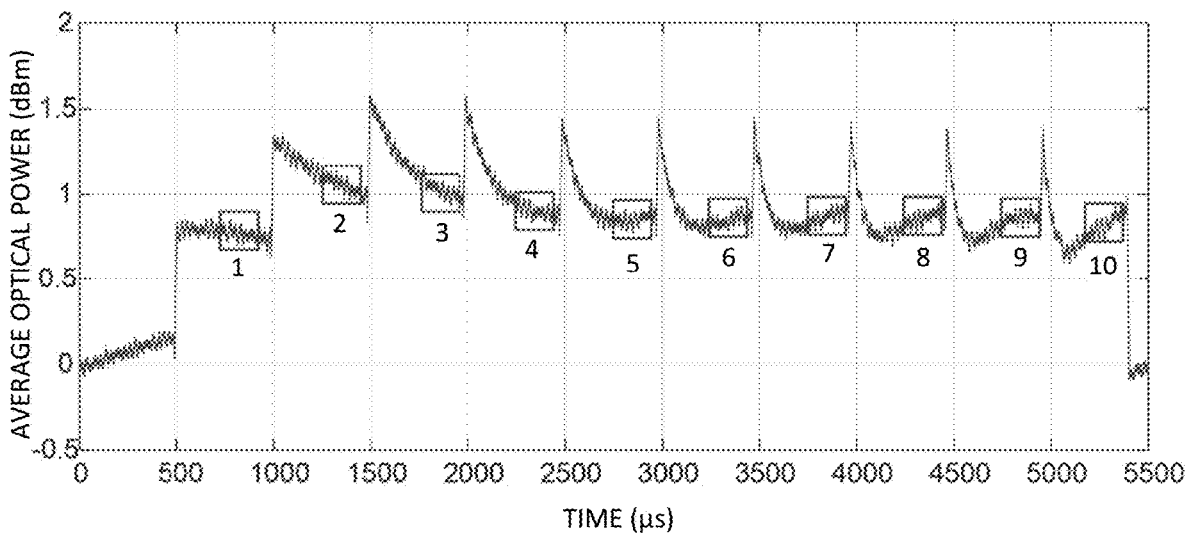
FIG. 12 illustrates a plot of measured average optical power in dBm as a function of time in μs of a signal output by the re-circulating loop system of FIG. 11 in accordance with some examples of the proposed technology.

FIG. 12 illustrates a plot of measured average optical power in dBm as a function of time in µs of a signal output by the re-circulating loop of FIG. 11.

The EDFAs 1112, 1114 in the loop 1120 may introduce signal artifacts which would not be present in an installed link. These artifacts are apparent from the transient peaks in FIG. 12, where each peak coincides with a successive orbit of the loop 1120. According to some examples, the measurements may account for these power variations by restricting sample collection to a stable period within each orbit, for example, the last ~200 µs of every orbit. The boxes in FIG. 12 indicate windows where measurements were taken. The number below each box indicates the associated number of loop orbits (or the number of spans being imitated by the system 1100).

Figure 13:
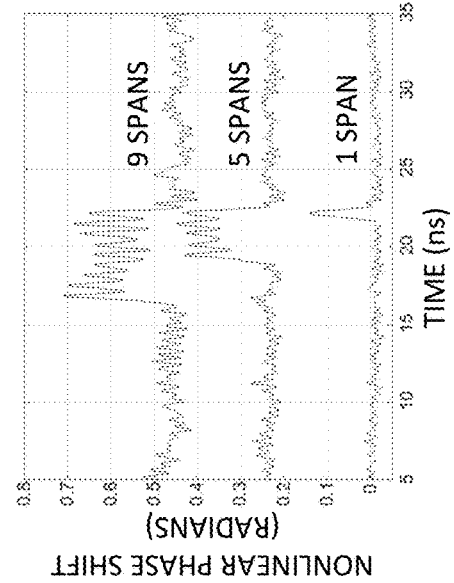
FIG. 13 illustrates a plot of measured nonlinear phase shift in radians as a function of time in ns of receiver-detected probe pulses associated with Type-N interactions for a 1-span link, a 5-span link, and a 9-span link, as imitated using the re-circulating loop system of FIG. 11 in accordance with some examples of the proposed technology.

FIG. 13 illustrates a plot of measured nonlinear phase shift in radians as a function of time in ns of receiver-detected probe pulses associated with Type-N interactions for a 1-span link, a 5-span link, and a 9-span link. For clarity, the 5-span curve and the 9-span curve are offset by 0.2 radians and 0.4 radians, respectively, relative to the 1-span curve.

The peaks in the curves in FIG. 13 represent amplified fiber spans. Due to a narrow pump pulse width (shorter duration), the nonlinear phase associated with Type-N interactions has a spatial resolution that is sufficiently high to distinguish each orbit of the loop 1120 (and therefore the respective amplified span imitated by that orbit). It is expected that the peaks are modulated by power variations between different orbits, thereby providing information that may be used to estimate launched power (or effective cross-sectional area of the fiber core) per orbit (or amplified span in a non-loop, real-world system). Additionally, the spacing between peaks may provide information that may be used to estimate the net CD per orbit (or amplified span in a real-world system).

Figure 14:
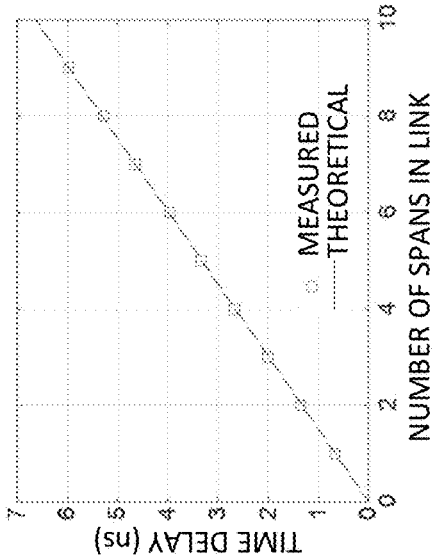
FIG. 14 illustrates a plot of measured and theoretical time delay in ns between narrow pump pulses and probe pulses for a plurality of different links consisting of n spans, where n=1 to 9, as imitated using the re-circulating loop system of FIG. 11 in accordance with some examples of the proposed technology.

FIG. 14 illustrates a plot of measured time delay or walk-off in ns between narrow pump pulses and probe pulses for a plurality of different links consisting of n spans, where n=1 to 9. Given the fiber dispersion parameter D=16.1 ps/nm/km, the fiber length L=101.29 km, and the pump/probe wavelength separation Δλ=0.4 nm, the theoretical walk-off between the pump and probe after a single span is D·Δλ·L=664 ps. The measured walk-off values are consistent with the theoretical prediction indicated by the solid line.

Figure 15:
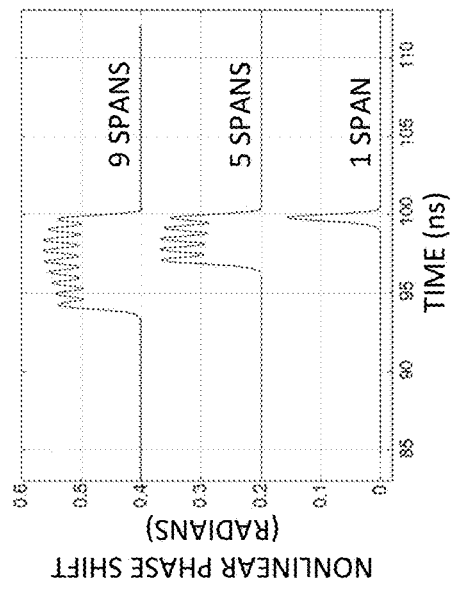
FIG. 15 illustrates a plot of simulated nonlinear phase shift in radians as a function of time in ns of receiver-detected probe pulses associated with Type-N interactions for a 1-span link, a 5-span link, and a 9-span link, as simulated using a split-step numerical simulation assuming equal power for each span in accordance with some examples of the proposed technology.

FIG. 15 illustrates a plot of simulated nonlinear phase shift in radians as a function of time in ns of receiver-detected probe pulses associated with Type-N interactions for a 1-span link, a 5-span link, and a 9-span link, as simulated using a split-step numerical (e.g., Fourier) simulation assuming equal power for each span. The simulation models a real-world system comprising multiple spans, that is, without the artifacts associated with the re-circulating loop system 1100. Similarly to the curves in FIG. 13, the 5-span curve and the 9-span curve are offset by 0.2 rad and 0.4 rad, respectively, relative to the 1-span curve. FIGS. 13 and 15 are both plotted over a period of 30 ns, with arbitrary starting times.

A comparison of the curves in FIG. 15 to those in FIG. 13 demonstrates good consistency between Type-N measurements obtained using the loop system 1100 and Type-N measurements obtained using a simulated multi-span link. The results in FIGS. 13-15 also indicate that nonlinear phase shift measurements of receiver-detected probe pulses associated with Type-N interactions may enable identification of a number of spans in a link, CD of each span in the link, and distribution of nonlinear phase among different spans in the link.

Figure 16:
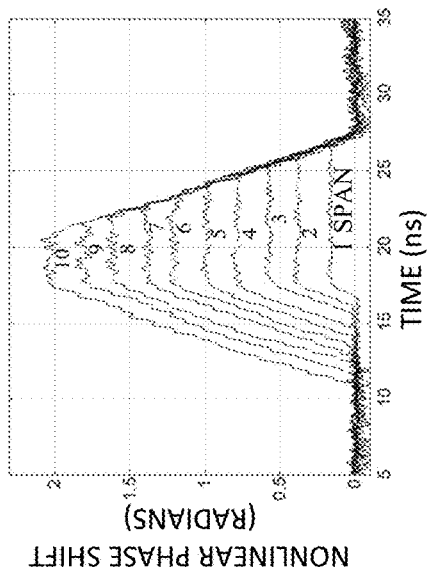
FIG. 16 illustrates a plot of measured nonlinear phase shift in radians as a function of time in ns of receiver-detected probe pulses associated with Type-B interactions for a plurality of different links consisting of n spans, where n=1 to 10, as imitated using the re-circulating loop system of FIG. 11 in accordance with some examples of the proposed technology.

FIG. 16 illustrates a plot of measured nonlinear phase shift in radians as a function of time in ns of receiver-detected probe pulses associated with Type-B interactions for a plurality of different links consisting of n spans, where n=1 to 10.

For Type-B interactions, the peak nonlinear phase shift of the detected probe pulses may provide a measure of the aggregated phase shift from all spans of the link (as imitated by the orbits of the loop 1120). The additional nonlinear phase shift associated with each additional span is shifted by 664 ps due to CD, so that the pulse width is narrowed by the same amount. As long as the pump pulse width is larger than the accumulated CD walk-off, the measured nonlinear phase shift curve shown in FIG. 16 always has a top region that this substantially flat. For this example, after ~10 orbits (spans) of ~100 km of non-dispersion-shifted fiber (NDSF), the walk-off may begin to compromise the measured peak aggregate phase shift. Larger orbit (span) counts for NDSF may be measured by using electronic CD pre-compensation or by shifting pump pulses relative to probe pulses at launch. With the implementation parameters in these examples, electronic CD pre-compensation would support up to ~20 spans (34 ns/nm).

Figure 17:
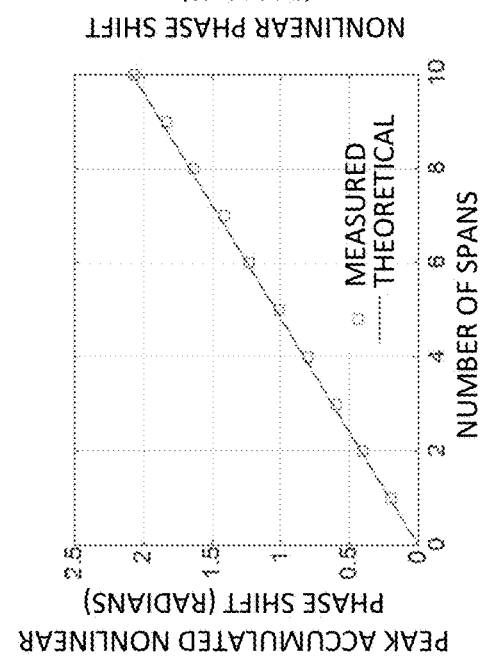
FIG. 17 illustrates a plot of measured and theoretical peak accumulated nonlinear phase shift in radians for a plurality of different links consisting of n spans, where n=1 to 10, as imitated using the re-circulating loop system of FIG. 11 in accordance with some examples of the proposed technology.

FIG. 17 illustrates a plot of measured peak accumulated nonlinear phase shift in radians for a plurality of different links consisting of n spans, where n=1 to 10. Each data point represents the average value over the substantially flat portion of a respective curve in FIG. 16. The solid line represents the theoretical phase shift as calculated according to Equation 3 with an average signal power of $P_{ave}$=3 mW used at the input of each fiber span.

Figure 18:
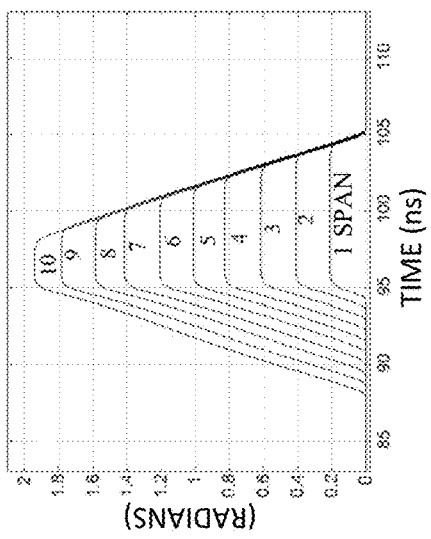
FIG. 18 illustrates a plot of simulated nonlinear phase shift in radians as a function of time in ns of receiver-detected probe pulses associated with Type-B interactions for a plurality of different links consisting of n spans, where n=1 to 10, as simulated using a split-step numerical simulation assuming equal power for each span in accordance with some examples of the proposed technology.

FIG. 18 illustrates a plot of simulated nonlinear phase shift in radians of receiver-detected probe pulses associated with Type-B interactions for a plurality of different links consisting of n spans, where n=1 to 10, as simulated using a split-step numerical (e.g., Fourier) simulation assuming equal power for each span. FIGS. 16 and 18 are both plotted over a period of 30 ns, with arbitrary starting times.

A comparison of the curves in FIG. 16 to those in FIG. 18 demonstrates good consistency between Type-B measurements obtained using the loop system 1100 and Type-B measurements obtained using a simulated multi-span link. The results in FIGS. 16-18 also indicate that nonlinear phase shift measurements of receiver-detected probe pulses associated with Type-B interactions may accurately predict the accumulated nonlinear phase shift along a multi-span fiber link.

The experimental results described thus far were obtained using a single-polarization coherent receiver, with a polarization controller placed between the link and the receiver. However, examples are contemplated wherein pump-induced nonlinear phase shift may be evaluated using a dual-polarization coherent receiver that is configured to select the probe signal while rejecting the pump signal. According to some examples, in order to avoid signal fading, the probe signal may be selected using digital signal processing performed after photodetection.

Figure 19:
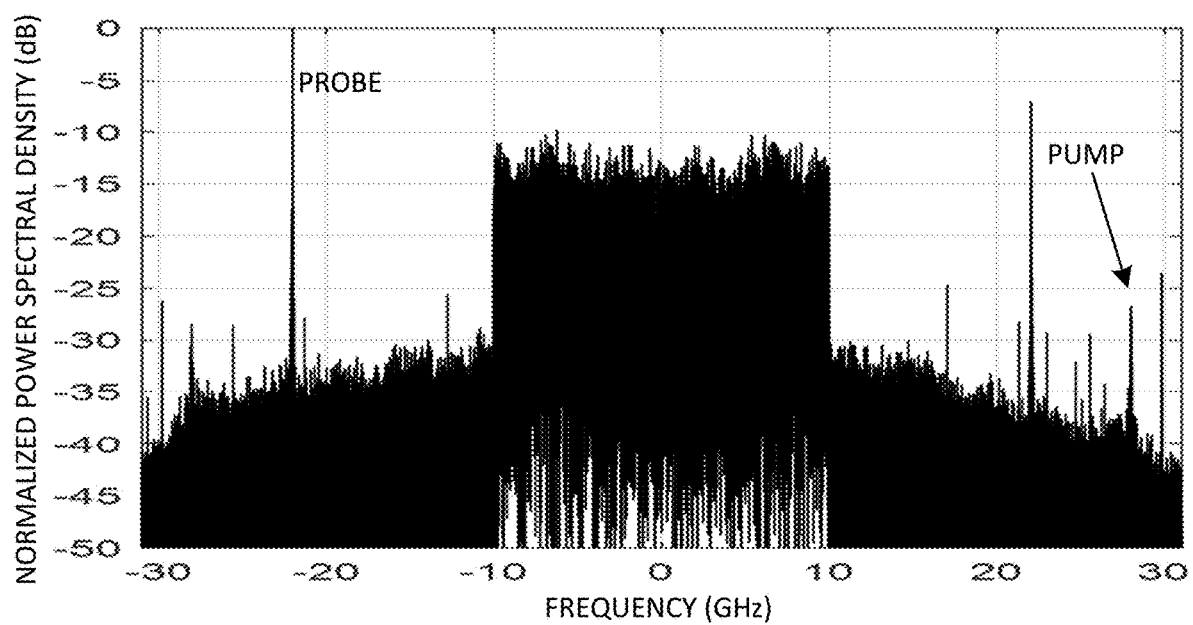
FIGS. 19 and 20 illustrate plots of normalized power spectral density in dB as a function of frequency in GHz of the complex field of a received optical signal in the X and Y polarizations, respectively, as measured using dual-polarization coherent detection, and normalized by the maximum power spectral density in the X polarization, in accordance with some examples of the proposed technology.
Figure 20:
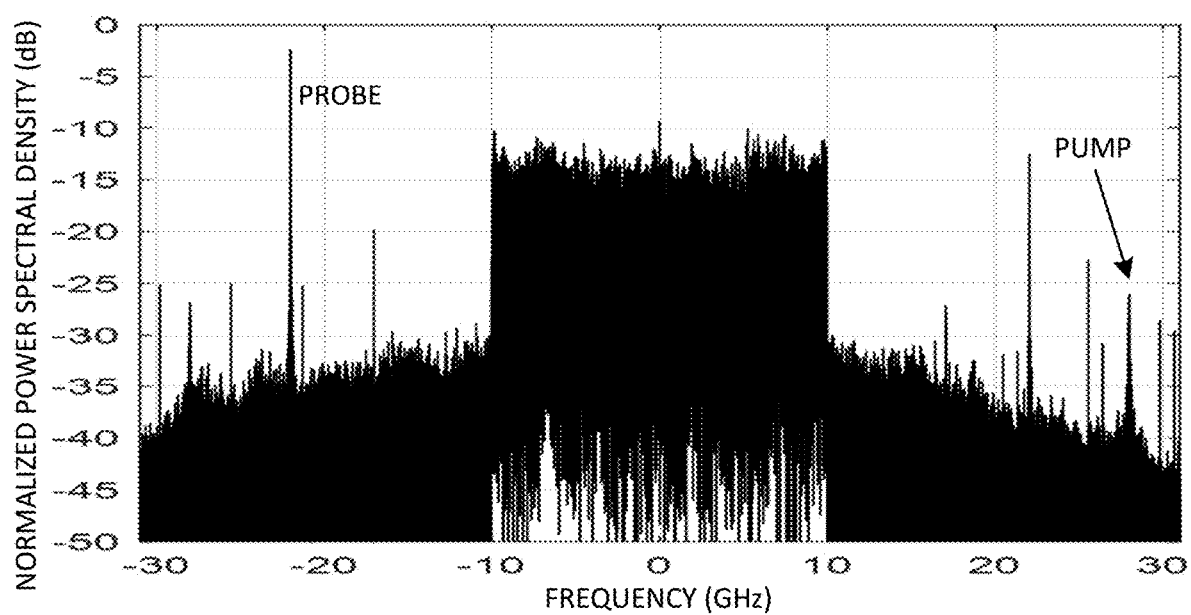

FIGS. 19 and 20 illustrate plots of normalized power spectral density in dB as a function of frequency in GHz of the complex field of the received optical signal in the X and Y polarizations, respectively, as measured using dual-polarization coherent detection, and normalized by the maximum power spectral density in the X polarization. In this example, the probe spectrum is centered at −22 GHz, and the pump spectrum is centered at 28 GHz.

The relative amplitudes of the X-polarized components and the Y-polarized components may vary randomly depending on the birefringence of the fiber. In order to recover the complex optical fields of the probe signal carried by the X-polarization and to reject the pump signal carried by the Y-polarization, the impact of the birefringence of the transmission fiber may be removed using a Jones matrix operation expressed as $$\begin{bmatrix} E_x(f) \\ E_y(f) \end{bmatrix} = \begin{bmatrix} \cos\psi & -e^{-j\xi(f)}\sin\psi \\ e^{j\xi(f)}\sin\psi & \cos\psi \end{bmatrix} \begin{bmatrix} E_{x0}(f) \\ E_{y0}(f) \end{bmatrix} \quad [5]$$

where $E_{x0}(f)$ denotes the frequency-domain version of the complex field represented by the signals 182, 184, where $E_{y0}(f)$ denotes the frequency-domain version the complex field represented by the signals 186, 188, where $E_x(f)$ and $E_y(f)$ are the complex fields recovered after removing the birefringence of the fiber, where the matrix parameter w denotes a polarization angle, where $\xi(f)=2\pi \cdot f \cdot \delta t$ denotes a frequency-dependent differential phase, and where the matrix parameter $6t$ denotes a differential group delay between the X-polarization and Y-polarization components. By design, the probe signal is X-polarized and pump signal is Y-polarized at the transmitter, and the matrix parameters $\psi$ and $\delta t$ may be obtained by maximizing the power of $E_x(f_{probe})$ and minimizing the power of $E_y(f_{probe})$ at the frequency of the probe pulse, $f_{probe}$ Referring to FIG. 1, the Jones matrix operation expressed in Equation 5 may be performed as part of the digital signal processing 192. For example, the Jones matrix operation may be applied prior to the processing 700 illustrated in FIG. 7, such that the signals 701, 705, represent time-domain versions of the complex signal $E_x$ and the signals 703, 707 represent time-domain versions of the complex signal $E_y$. In other words, FFT operations may be applied to the time-domain signals 182, 184, 186, 188 in FIG. 1, followed by application of the Jones matrix in the frequency domain, and the resulting signals may be converted back to the time domain by IFFT operations, prior to being input to the processing 700. In this case, the Jones matrix operation would be performed at 22 GHz, prior to the frequency down-conversion process.

As previously described, the frequency of the probe pulse may be selected using a digital filter as shown, for example, at 714, 716, where the filter may have a FWHM bandwidth of 6 GHz. According to some examples, the power of the probe signal may be maximized by performing the Jones matrix operation after frequency down-conversion of the filtered signal to the baseband. For example, the processing in FIG. 7 may be modified such that the addition operations 702, 706 are removed and the FFT operations 710, 712 have two inputs and two outputs. With these modifications, the Jones matrix may be applied as part of the operations 714, 716, or immediately thereafter (prior to the IFFT operation 718, 720). Applying the Jones matrix as a narrowband operation with down-sampled data may reduce processing power or time or both.

FIGS. 21 and 22 illustrate plots of power spectral density in dB as a function of frequency in GHz of the complex field of the frequency-down-converted probe pulse in the X and Y polarizations, respectively, normalized by the maximum power spectral density in the Y polarization, prior to polarization selection using the Jones matrix operation.

FIG. 23 illustrates a plot of power spectral density in dB as a function of frequency in GHz of the complex field of the frequency-down-converted probe pulse in the Y polarization, normalized by the maximum power spectral density in the X-polarization, after polarization selection using the Jones matrix operation. A comparison of FIG. 23 to FIG. 22 shows that the Jones matrix operation achieves a polarization extinction ratio of approximately 35 dB. In this example, the amplitude of the probe signal in the X-polarization is increased by approximately 1 dB following the polarization selection. This is because the power of the probe signal in the Y-polarization is already 5 dB lower than in the X-polarization, even prior to the polarization selection. The proposed polarization selection operation may avoid signal fading in the measurement due to the randomness of the fiber birefringence.

In some examples, the impact of PDL in the fiber may additionally be considered by using a non-unitary matrix in place of the simple unitary Jones matrix of Equation 5.

Figure 24:
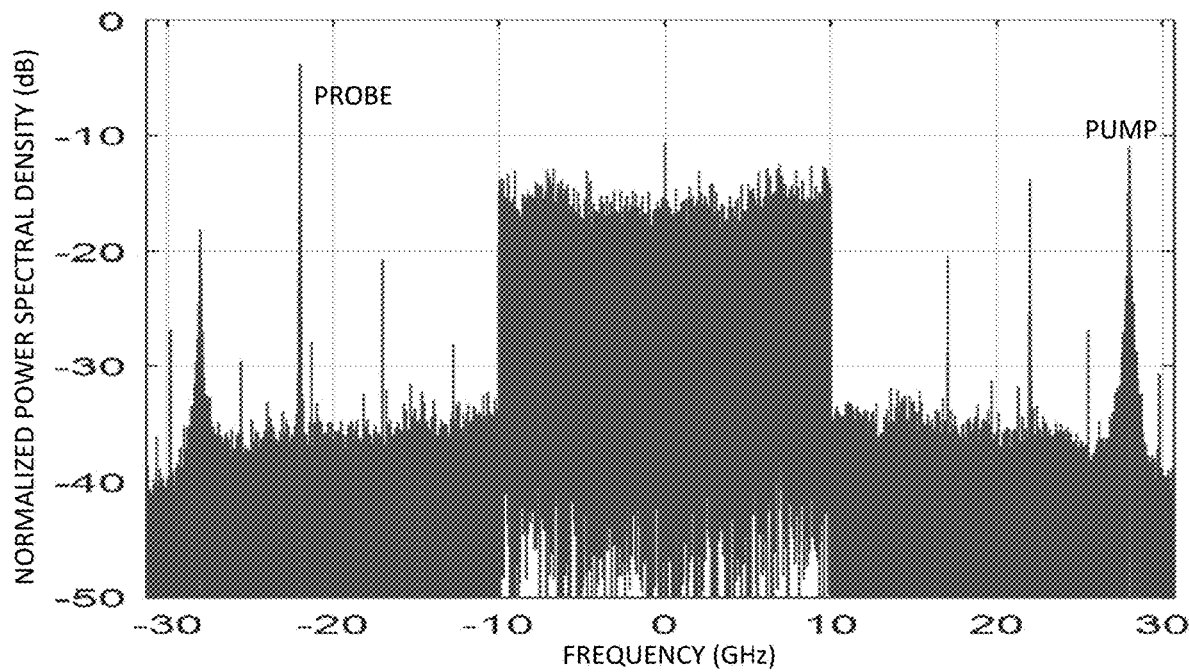
FIGS. 24 and 25 illustrate plots of normalized power spectral density in dB as a function of frequency in GHz of the complex field of the received optical signal in the X and Y polarizations, respectively, as measured using coherent homodyne detection, and normalized by the maximum power spectral density in the Y polarization, in accordance with some examples of the proposed technology.
Figure 25:
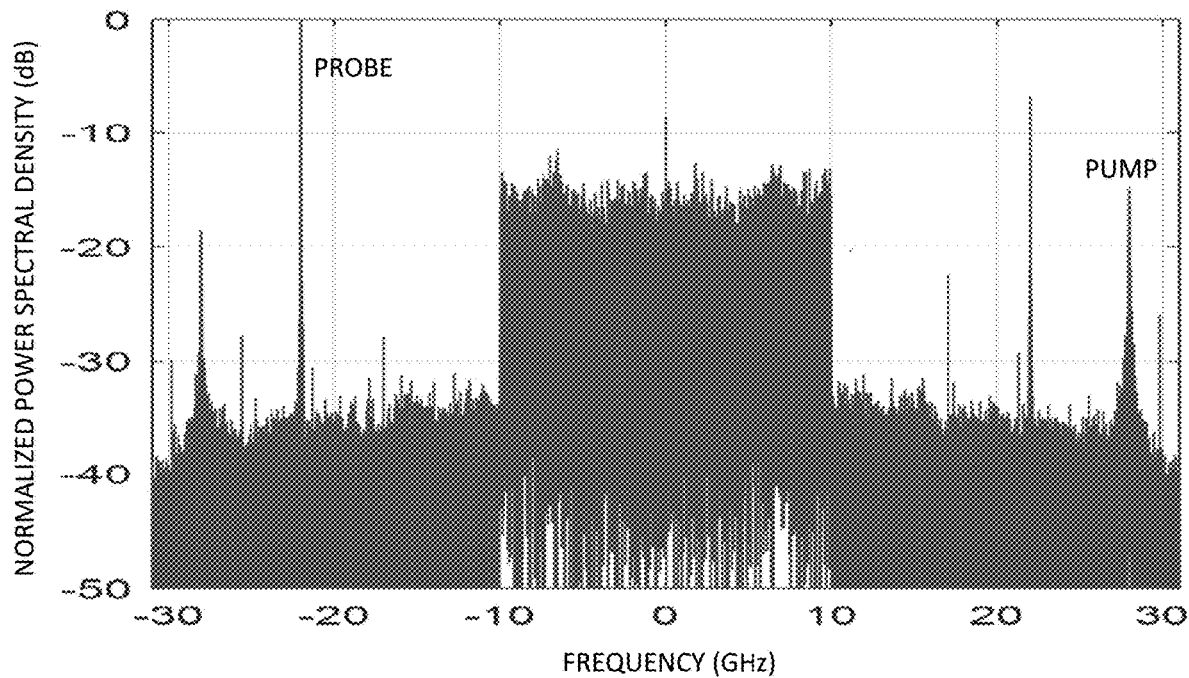
Figure 26:
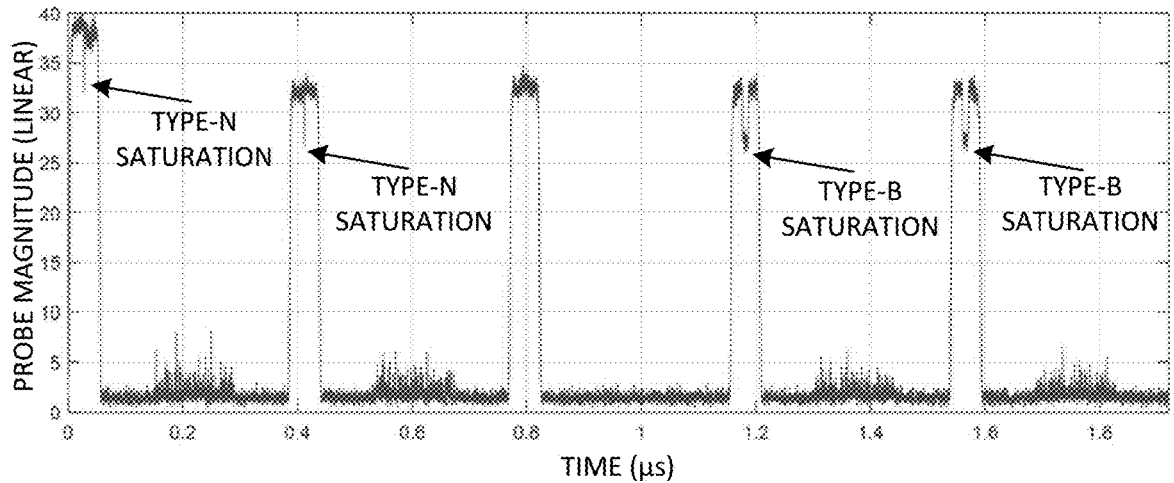
FIG. 26 illustrates a plot of magnitude in linear units over time in µs of an average of five consecutive repetitions of a probe waveform as detected at a coherent receiver following 6-GHz digital filtering and polarization selection in accordance with some examples of the proposed technology.

Even though filtering and polarization selection may be used to select the probe pulses for phase measurements, the pump pulses may still have a significant impact on the amplitude of the probe waveform. For example, FIGS. 24 and 25 illustrate plots of normalized power spectral density in dB as a function of frequency in GHz of the complex field of the received optical signal in the X and Y polarizations, respectively, as measured using coherent homodyne detection, and normalized by the maximum power spectral density in the Y polarization. In this example, a broad optical filter has been placed in front of the receiver which covers both the pump peak at +28 GHz and the probe peak at −22 GHz. The presence of the pump pulse frequency in the detected signal may result in unwanted saturation of the probe signal due to nonlinear responses in the photodetectors 165, 166, 167, 168 and/or the RF pre-amplifiers 169, 170, 171, 172. For example, FIG. 26 illustrates a plot of magnitude in linear units over time in μs of an average of five consecutive repetitions of a probe waveform as detected at a coherent receiver following 4 GHz digital filtering and polarization selection. The probe waveform used in this example corresponds to the probe waveform 504, which has experienced interactions with the pump waveform 502. Thus, the first and second probe pulses are associated with Type-N interactions; the third probe pulse is associated a Type-R interaction; and the third and fourth probe pulses are associated with Type-B interactions. The arrows indicate the respective effects of pump-induced saturation on each of the five probe pulses. Notably, there is no pump-induced saturation of the third probe pulse since this pulse coincides with the reference pump signal (no pulse).

Pump-induced saturation may significantly affect the accuracy of nonlinear phase measurements performed on the receiver-detected probe pulses. One technique for avoiding or limiting pump-induced saturation is to move the wavelength of the local oscillator in the coherent receiver closer to the wavelength of the probe pulse. This will cause the frequency of the pump pulse to be shifted out of the electric bandwidth of the receiver. For example, referring to the spectra shown in FIGS. 24 and 25, a decrease of 10 GHz in the local oscillator optical frequency (to −10 GHz) would result in the frequency of the pump pulse being moved up from +28 GHz to +38 GHz, which would be outside of the bandwidth detectable at the receiver.

Figure 27:
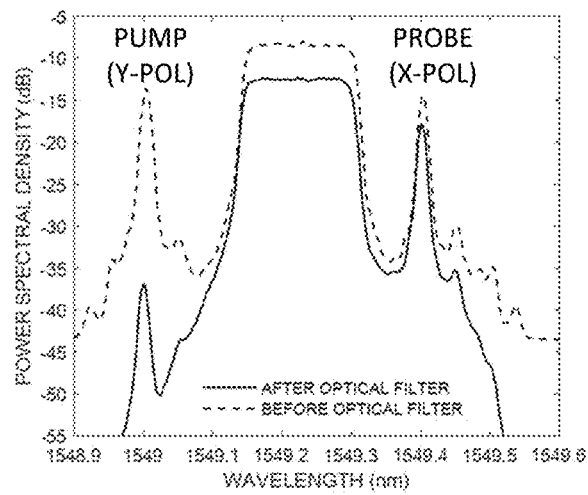
FIG. 27 illustrates a plot of power spectral density in dB as a function of wavelength in nm of an optical signal detected at the input of a receiver, such as the receiver 105, before and after optical filtering for pump frequency attenuation in accordance with some examples of the proposed technology.
Figure 28:
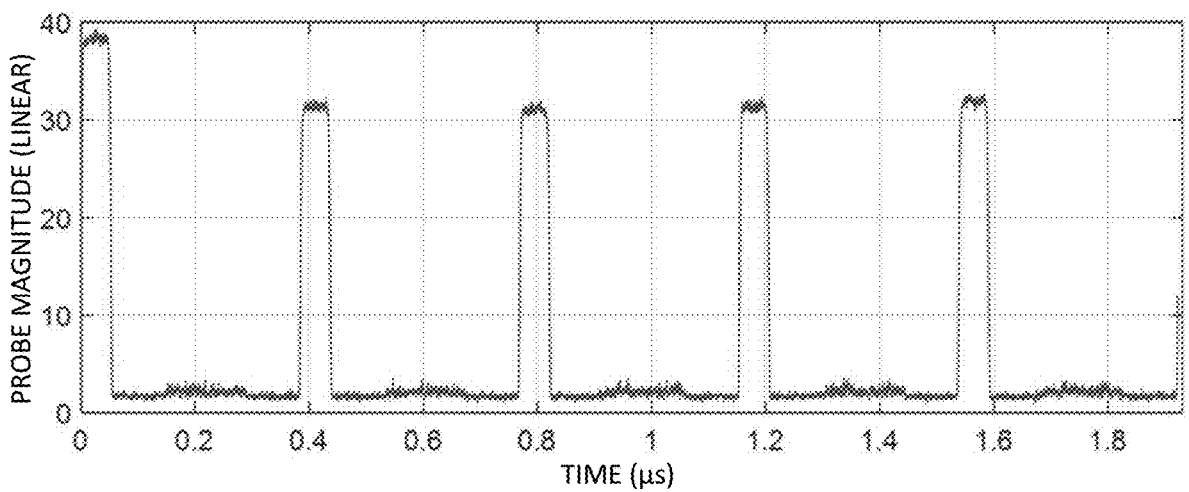
FIG. 28 illustrates a plot of magnitude in linear units as a function of time in µs of an average of five consecutive repetitions of a probe waveform as detected at a coherent receiver following optical filtering for pump frequency attenuation, 6-GHz digital filtering for probe frequency selection, and probe polarization selection in accordance with some examples of the proposed technology.

Another technique for reducing pump-induced saturation is the use of an optical filter or WDM demultiplexer to attenuate the pump pulse frequency before the optical signal is detected at the receiver. The optical filter may be configured to select the probe spectrum, while rejecting the pump spectrum. For example, the FWHM bandwidth of the optical filter may be 6 GHz or broader (centered at the central probe frequency), but less than 50 GHz so as to reject the pump spectrum (which is 50 GHz away in this example). The optical filter could be placed at an input of the optical receiver 105. FIG. 27 illustrates a plot of power spectral density in dB as a function of wavelength in nm of an optical signal detected at the input of a receiver, such as the receiver 105, before and after optical filtering for pump pulse frequency attenuation. The optical filtering significantly attenuates the power of the pump pulses, while substantially maintaining the power of the probe pulses. FIG. 28 illustrates a plot of magnitude in linear units as a function of time in μs of an average of five consecutive repetitions of a probe waveform as detected at a coherent receiver following optical filtering for pump pulse frequency attenuation, digital filtering for selection of the probe pulse frequency, and polarization selection for selection of the probe signal. A comparison between FIG. 28 and FIG. 26 demonstrates the removal of pump-induced saturation that is achieved by the optical filter.

Figure 31:
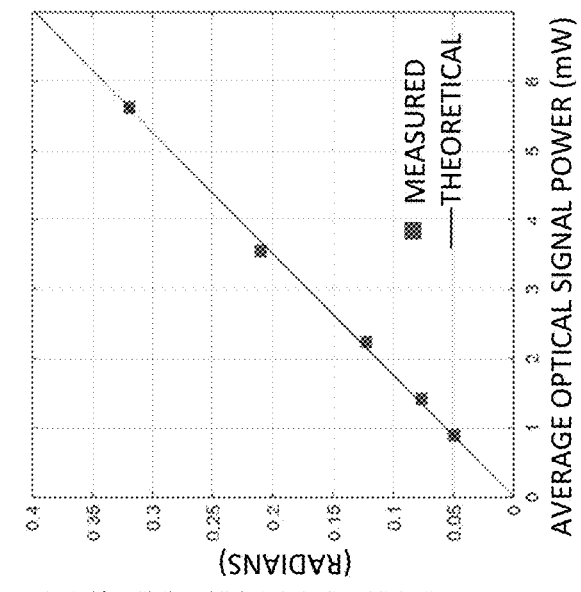
FIG. 31 illustrates a plot of measured and theoretical peak nonlinear phase shift in radians as a function of average signal optical power in mW for Type-B interactions in accordance with some examples of the proposed technology.
Figure 30:
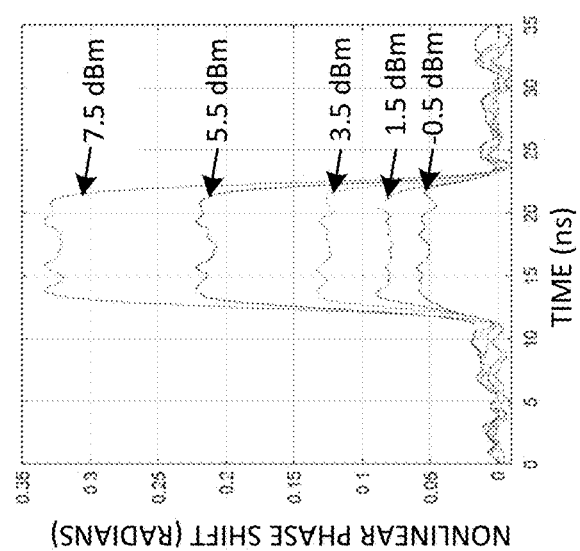
FIG. 30 illustrates a plot of measured nonlinear phase shift in radians as a function of time in ns of receiver-detected probe pulses associated with Type-B interactions, where each curve represents a different average power in dBm of the optical signal in accordance with some examples of the proposed technology.
Figure 29:
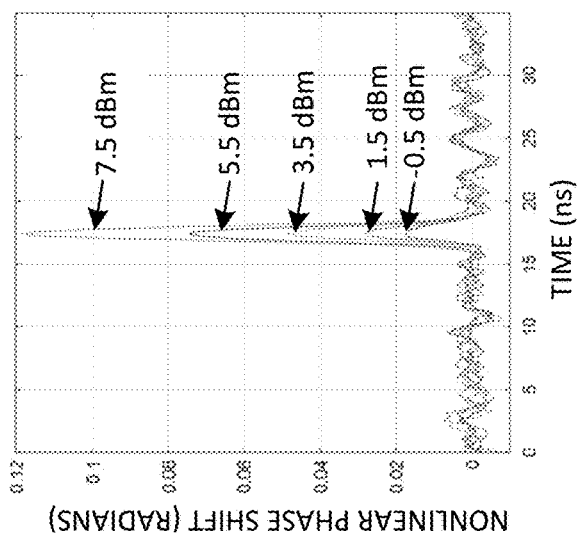
FIG. 29 illustrates a plot of measured nonlinear phase shift in radians as a function of time in ns of receiver-detected probe pulses associated with Type-N interactions, where each curve represents a different average power in dBm of the optical signal in accordance with some examples of the proposed technology.

FIGS. 29, 30, and 31 illustrate experimental results corresponding to those of FIGS. 8, 9, and 10, except that the results were obtained using a commercial dual-polarization coherent optical receiver, such as the receiver 105 in FIG. 1.

FIG. 29 illustrates a plot of measured nonlinear phase shift in radians as a function of time in ns of receiver-detected probe pulses associated with Type-N interactions. FIG. 30 illustrates a plot of measured nonlinear phase shift in radians as a function of time in ns of receiver-detected probe pulses associated with Type-B interactions. The measurements in each plot were made for different average optical signal power ($P_{ave}$) levels launched into the link, in units of dBm.

FIG. 31 illustrates a plot of peak nonlinear phase shift in radians as a function of average optical signal power in mW for Type-B interactions. Each square represents the average measured value over the substantially flat portion of the respective curve in FIG. 30. The solid line represents the theoretical phase shift $\varphi_{NL}$ in radians as a function of average signal power $P_{ave}$ in mW, as calculated according to Equations 3 and 4. In this example, the shape of the waveforms is such that the conversion ratio used in Equation 4 is C=2.5, meaning that $P_{pump}(0)=2.5 \cdot P_{ave}$.

In accordance with some examples of the proposed technology, a transmitter device comprises circuitry configured to generate an optical signal for transmission over a multi-span fiber-optic link, where the optical signal is designed such that it may be used at a coherent receiver device to estimate nonlinear phase shift in the link.

Figure 32:
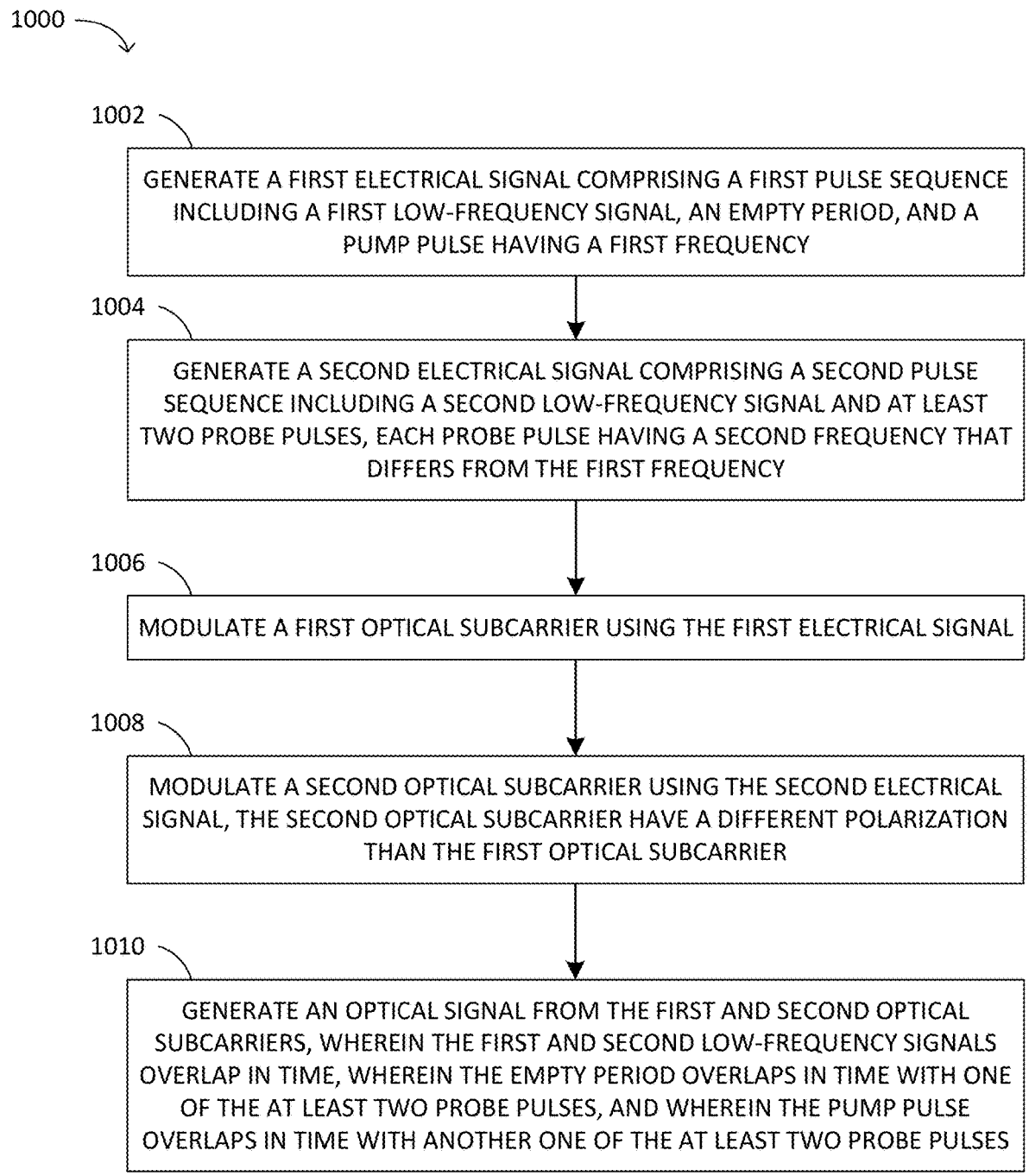
FIG. 32 illustrates a method for generating an optical signal for transmission over an optical link in accordance with some examples of the proposed technology.

FIG. 32 illustrates an example method 1000 for generating an optical signal for transmission over an optical link. The method 1000 may be performed at a transmitter, such as the transmitter 101.

At 1002, a first electrical signal is generated which comprises a first pulse sequence including a first low-frequency signal, an empty period, and a pump pulse having a first frequency. At 1004, a second electrical signal is generated which comprises a second pulse sequence including a second low-frequency signal and at least two probe pulses, each probe pulse having a second frequency that differs from the first frequency.

According to some examples, at least one of the probe pulses may have a different amplitude than an amplitude of at least one other of the probe pulses, for example, as described with respect to FIG. 5.

According to some examples, the first and second low-frequency signals may comprise band-limited noise having a mean of zero (such as Gaussian noise) and a central frequency between the first frequency and the second frequency.

According to some examples, each probe pulse may comprise substantially stable power (that is, a substantially flat top) for a duration greater than twice the pump-probe walk-off anticipated following transmission of the optical signal over all spans of the optical link, where the pump-probe walk-off corresponds to the CD-induced temporal delay between the pump pulse and the probe pulse with which the pump pulse overlaps. According to some examples, each probe pulse may comprise a high-order super-Gaussian pulse (for example, tenth-order or higher). In one example, each probe pulse has a duration of 50 ns. For example, given L=1000 km of NDSF having a fiber dispersion parameter D=17 ps/nm/km and given a pump-probe frequency separation of Δf=40 GHz (which corresponds to a wavelength separation of Δλ≈0.33 nm), the probe pulse width may be selected to be greater than 2·D·Δλ·L≈2·(17 ps/nm/km)·(0.33 nm)·(1000 km)≈11 ns.

According to some examples, the pump pulse has a duration lower than the CD-induced pump-probe walk-off anticipated following transmission of the optical signal over a single span of the optical link. In one example, the pump pulse may comprise a regular Gaussian pulse and may have a duration of 150 ps or lower.

According to some examples, the pump pulse may comprise substantially stable power for a duration greater than the CD-induced pump-probe walk-off anticipated following transmission of the optical signal over the entire optical link (i.e., all spans). According to some examples, the pump pulse may comprise a high-order super-Gaussian pulse (for example, tenth-order or higher). In one example, the pump pulse has a duration of 10 ns or greater.

According to some examples, the pump pulse may comprise a first pump pulse, and the first pulse sequence may further include a second pump pulse having a different duration than the first pump pulse, and where the second pump pulse overlaps in time with a further one of the probe pulses. For example, the first pump pulse may comprise a narrow pump pulse (e.g., having a duration of 150 ps or lower), and the second pump pulse may comprise a broad pump pulse (e.g., having a duration of 10 ns or greater) or vice versa.

According to some examples, the first pulse sequence may comprise multiple instances of the first low-frequency signal and multiple instances of the pump pulse, and the second pulse sequence may comprise an instance of the second low-frequency signal for each instance of the first low-frequency signal, and an instance of the probe pulse for each instance of the pump pulse. For example, the first pulse sequence may comprise the pump waveform 502, which includes five instances of the first low-frequency noise burst and two instances of the narrow pump pulse (and two instances of the broad pump pulse), while the second pulse sequency may comprise the pulse waveform 504, which includes an instance of the second low-frequency noise burst for each instance of the first low-frequency noise burst, and an instance of the probe pulse for each instance of the pump pulse.

According to some examples, the first electrical signal may comprise multiple repetitions of the first pulse sequence, and the second electrical signal may comprise a repetition of the second pulse sequence for each repetition of the first pulse sequence. For example, as shown in FIG. 6, the probe waveform 502 may be repeated for a period of time.

At 1006, a first optical subcarrier is modulated using the first electrical signal. At 1008, a second optical subcarrier is modulated using the second electrical signal, the second optical subcarrier having a different polarization than the first optical subcarrier. According to some examples, the first and second optical subcarriers are orthogonally polarized. For example, as described with respect to FIG. 1, the first optical subcarrier may comprise the signal 116 and the second optical subcarrier may comprise the signal 118 or vice versa.

At 1010, an optical signal is generated from the first and second optical subcarriers, wherein the first and second low-frequency signals overlap in time, wherein the empty period overlaps in time with one of the at least two probe pulses, and wherein the pump pulse overlaps in time with another one of the at least two probe pulses. For example, as described with respect to FIG. 1, the optical signal 122 is generated from the signals 116 and 118.

In accordance with some examples of the proposed technology, a receiver device comprises circuitry configured to estimate nonlinear phase shift of a degraded version of the optical signal generated by a transmitter device according to the method 1000, the degradations having been incurred over a multi-span fiber optic link between the transmitter device and the receiver device.

Figure 33:
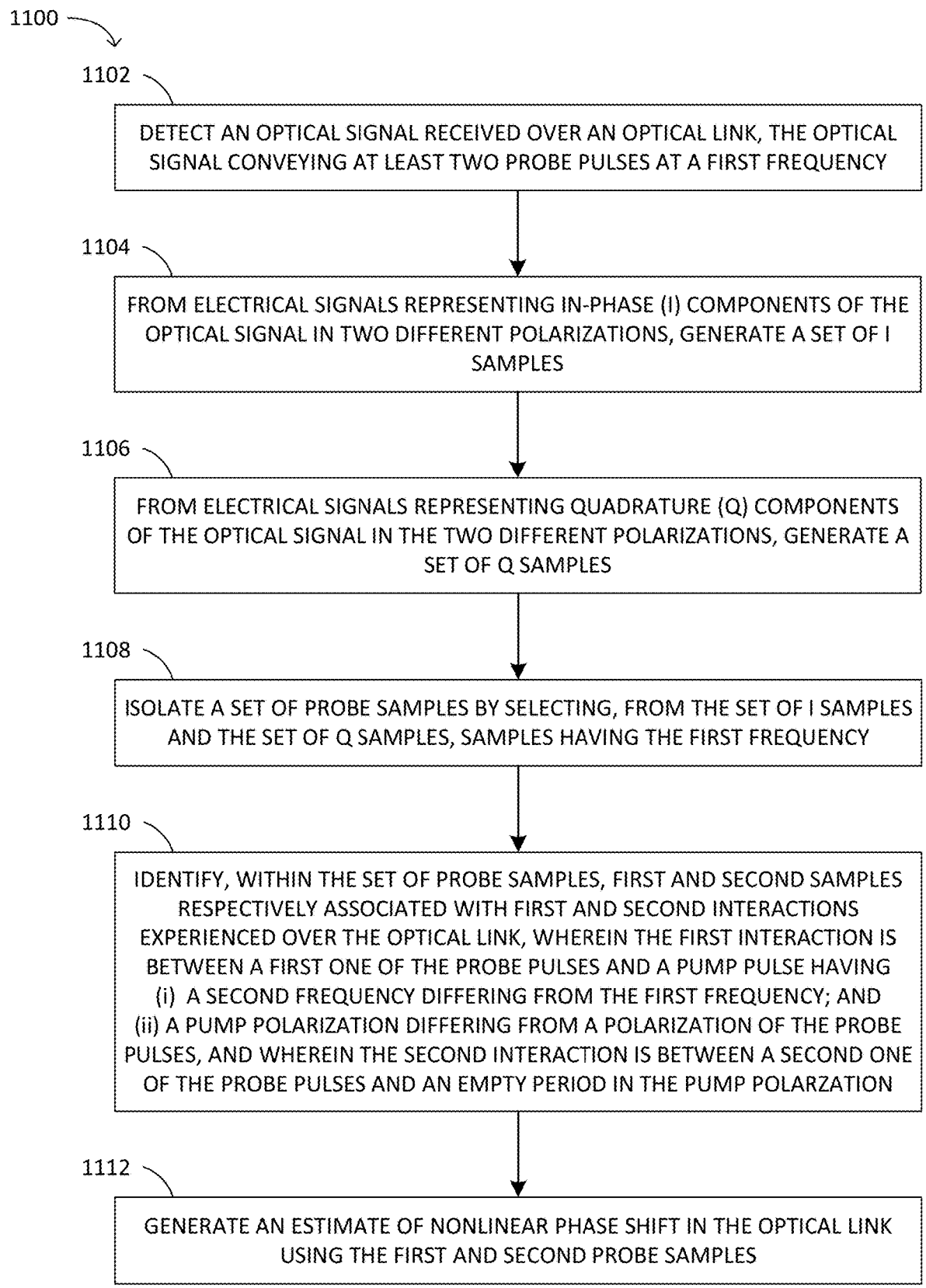
FIG. 33 illustrates a method for estimating nonlinear phase shift in an optical link in accordance with some examples of the proposed technology.

FIG. 33 illustrates an example method 1100 for estimating nonlinear phase shift in an optical link. The method 1100 may be performed at a receiver, such as the receiver 105.

At 1102, an optical signal received over an optical link is detected at the receiver. The optical signal conveys at least two probe pulses at a first frequency. For example, as described with respect to FIG. 1, the optical signal may comprise the signal 150, which may be generated at a transmitter according to the method 1000.

At 1104, a set of I samples is generated from electrical signals representing I components of the optical signal in two different polarizations. For example, as described with respect to FIG. 7, the set of I samples may comprise the samples 704 generated from the electrical signals 701, 703 (corresponding to the signals 182, 186 described with respect to FIG. 1).

At 1106, a set of Q samples is generated from electrical signals representing Q components of the optical signal in the two different polarizations. For example, the set of Q samples may comprise the samples 708 generated from the electrical signals 705, 707 (corresponding to the signals 184, 188 described with respect to FIG. 1).

At 1108, a set of probe samples is isolated by selecting, from the set of I samples and the set of Q samples, samples having the first frequency. For example, the set of probe samples may comprise the samples 736 generated, in part, as a result of the operations 714, 716.

At 1110, first and second samples are identified within the set of probe samples, the first and second samples respectively associated with first and second interactions experienced over the optical link. The first interaction is between a first one of the probe pulses and a pump pulse, where the pump pulse has (i) a second frequency differing from the first frequency, and (ii) a pump polarization differing from a polarization of the probe pulses. The second interaction is between a second one of the probe pulses and an empty period in the pump polarization. The identification of the first and second samples may be implemented, for example, using the operations 722, 724. For example, the first and second samples may be identified by framing the probe pulse sequence using, for example, the different respective amplitudes of the probe pulses. According to some examples, the first interaction may comprise a Type-N interaction or a Type-B interaction, while the second interaction may comprise a Type-R interaction.

According to some examples, the pump polarization is orthogonal to the polarization of the probe pulses.

According to some examples, each of the probe pulses comprises substantially stable power for a duration greater than twice the CD-induced pump-probe walk-off following transmission of the optical signal over all spans of the optical link.

At 1112, an estimate of nonlinear phase shift induced by XPM in the optical link is generated using the first and second probe samples. For example, as described with respect to the operation 738 (or 740), the first sample, which is a Type-N(or Type-B) sample may be multiplied by the complex conjugate of the second sample, which is a Type-R sample, to determine an estimate of the difference between the optical phases of the first and second samples, that is $\theta_N(t)-\theta_R(t)$ (or $\theta_B(t)-\theta_R(t)$).

According to some examples, the first and second samples may comprise a plurality of first samples and a plurality of second samples taken over multiple repetitive data frames, and the method 1100 may further comprise calculating the estimate of nonlinear phase shift induced by XPM by performing an average of the optical phase difference estimates over the multiple data frames, as described with respect to the operation 742 (or 744), thereby reducing the impact of noise.

According to some examples, the method 1100 may further comprise using the first estimate of nonlinear phase shift to estimate one or more of a number of spans comprised in the optical link, a power level of each span in the link, an optical fiber type of each span in the link, CD of each span in the link, net CD of the link, and self-phase modulation in the link.

According to some examples, the method 1100 may further comprise identifying within the set of probe samples a third sample associated with a third interaction experienced over the optical link, wherein the third interaction is between a third one of the probe pulses and a second pump pulse having the second frequency and the pump polarization, and wherein the second pump pulse has a different duration than the first pump pulse. The method 1100 may further comprise generating a second estimate of nonlinear phase shift in the optical link using the second and third samples. For example, where the first interaction is a Type-N interaction (associated with first pump pulse of short duration or narrow width), the second pump pulse may be designed to have a longer duration than the first pump pulse, such that the third interaction is a Type-B interaction. In this case, the second estimate of nonlinear phase shift is determined from the product of the third samples (associated with the Type-B interaction) and the complex conjugate of the second samples (associated with the Type-R interaction).

According to some examples, the method 1100 may further comprise applying a digital bandpass filter to the set of I samples and the set of Q samples, where the digital bandpass filter attenuates any samples having frequencies outside of a bandwidth comprising the first frequency. In one example, the FWHM bandwidth is 6 GHz or lower.

According to some examples, the method 1100 may further comprise applying a Jones matrix operation to the electrical signals representing the I and Q components of the two polarizations of the optical signal, thereby maximizing those of the electrical signals representing the polarization of the probe pulses, and minimizing those of the electrical signals representing the pump polarization.

Estimates of the accumulated nonlinear phase shift, in combination with estimates of the localized (e.g., per-span) nonlinear phase shift, may provide a measure of nonlinearity due to the provisioning of the channel and the fiber properties of its path. At installation, such measurements may provide a modem with information about its line provisioning and dispersion map. Such estimates might not be available in a disaggregated network. Even in a network where similar estimates are available, any measurement redundancy of independent origin may provide a means of improving the accuracy of the estimate.

The collective of accumulated phase measurements from modems of a meshed network may be used to locate dispersion and power-per-section or power-per-span. The use of a single transmitter for transmitting both the pump and probe signals automatically synchronizes pump and probe pulse trains and avoids relative temporal walk-off and jitter.

It is contemplated that PDL per span may be assessed using Type-N interactions, by duplicating the measurements after swapping polarizations and frequencies of the pump and probe signals. That is, by observing the difference in the per-span phase for the pump polarization in two orthogonal directions, it is possible to obtain an order-of-magnitude estimate of the instance of PDL from the transmitter up to the location of a span. In order for such measurements to provide information on PDL, the same PDL must be experienced at both frequencies and both polarizations. Thus, it is important that polarizations that are orthogonal at the transmitter remain orthogonal over the link. The frequency separation over which polarizations remain correlated is dictated by the mean DGD, specifically, 400 GHz per mean DGD in ps. Thus, estimation of PDL using this method may require a pump-probe spectral separation of <400 GHz per mean DGD in ps, where the operative mean DGD is the mean DGD of the link (transmitter to receiver) in order to ensure the two transmit orthogonal polarizations remain orthogonal for the length of the link.

The scope of the claims should not be limited by the details set forth in the examples, but should be given the broadest interpretation consistent with the description as a whole.

What is claimed is:

1. A transmitter apparatus comprising:
   circuitry configured to generate a first electrical signal comprising a first pulse sequence including a first low-frequency signal, an empty period, and a pump pulse having a first frequency;
   circuitry configured to generate a second electrical signal comprising a second pulse sequence including a second low-frequency signal and at least two probe pulses, each probe pulse having a second frequency that differs from the first frequency;
   circuitry configured to modulate a first optical subcarrier using the first electrical signal;
   circuitry configured to modulate a second optical subcarrier using the second electrical signal, the second optical subcarrier having a different polarization than the first optical subcarrier; and
   circuitry configured to generate, from the first and second optical subcarriers, an optical signal for transmission over an optical link, wherein the first and second low-frequency signals overlap in time, wherein the empty period overlaps in time with one of the probe pulses, and wherein the pump pulse overlaps in time with another one of the probe pulses.

2. The transmitter apparatus as claimed in claim 1, wherein at least one of the probe pulses has a different amplitude than an amplitude of at least one other of the probe pulses.

3. The transmitter apparatus as claimed in claim 1, wherein the first and second optical subcarriers are orthogonally polarized.

4. The transmitter apparatus as claimed in claim 1, wherein the first and second low-frequency signals comprise band-limited noise having a mean of zero and a central frequency between the first and second frequencies.

5. The transmitter apparatus as claimed in claim 1, wherein each of the probe pulses comprises substantially stable power for a duration greater than twice a pump-probe walk-off anticipated following transmission of the optical signal over all spans of the optical link, the pump-probe walk-off comprising a temporal delay, induced by chromatic dispersion (CD), between the pump pulse and the probe pulse with which the pump pulse overlaps.

6. The transmitter apparatus as claimed in claim 1, wherein the pump pulse has a duration lower than a pump-probe walk-off anticipated following transmission of the optical signal over a single span of the optical link, the pump-probe walk-off comprising a temporal delay, induced by chromatic dispersion (CD), between the pump pulse and the probe pulse with which the pump pulse overlaps.

7. The transmitter apparatus as claimed in claim 1, wherein the pump pulse comprises substantially stable power for a duration greater than a pump-probe walk-off anticipated following transmission of the optical signal over all spans of the optical link, the pump-probe walk-off comprising a temporal delay, caused by chromatic dispersion (CD), between the pump pulse and the probe pulse with which the pump pulse overlaps.

8. The transmitter apparatus as claimed in claim 1, wherein the pump pulse comprises a first pump pulse, wherein the first pulse sequence further includes a second pump pulse having a different duration than the first pump pulse, and wherein the second pump pulse overlaps in time with a further one of the probe pulses.

9. The transmitter apparatus as claimed in claim 1, wherein the first electrical signal comprises multiple repetitions of the first pulse sequence, and wherein the second electrical signal comprises a repetition of the second pulse sequence for each repetition of the first pulse sequence.

10. The transmitter apparatus as claimed in claim 1, wherein the first pulse sequence comprises multiple instances of the first low-frequency signal and multiple instances of the pump pulse, and wherein the second pulse sequence comprises an instance of the second low-frequency signal for each instance of the first low-frequency signal, and an instance of the probe pulse for each instance of the pump pulse.

* * * * *